United States Patent [19]

Shibahashi et al.

[11] 4,425,161
[45] Jan. 10, 1984

[54] THERMOCHROMIC MATERIALS

[76] Inventors: Yutaka Shibahashi, No. 22-1, Ubakoyama, Narumi-cho, Midori-ku, Nagoya-shi, Aichi; Norikazu Nakasuji, No. 1-496, Haruki Shiratsuchi, Togo-cho, Aichi-gun, Aichi; Takashi Kataoka, No. 6-4-18,, Ishiodai, Kasugai-shi, Aichi; Hiroshi Inagaki, No. 4-6-27, Kitayamadai, Togo-cho, Aichi-gun, Aichi; Tsutomu Kito, No. 1-11-29,, Josai, Nishi-ku, Nagoya-shi, Aichi, all of Japan

[21] Appl. No.: 324,701

[22] Filed: Nov. 24, 1981

[30] Foreign Application Priority Data

Nov. 27, 1980 [JP] Japan .................. 55-167134

[51] Int. Cl.³ ............................................. C09D 11/00
[52] U.S. Cl. .................................. 106/21; 427/148; 427/150
[58] Field of Search .................. 106/21; 427/148, 150; 282/27.5

[56] References Cited

U.S. PATENT DOCUMENTS

| | | | |
|---|---|---|---|
| 3,251,881 | 5/1966 | Middlesex et al. | 260/576 |
| 3,341,464 | 9/1967 | Susi et al. | 252/300 |
| 3,615,749 | 10/1971 | Cramer et al. | 106/23 |
| 4,028,118 | 6/1977 | Nakasuji et al. | 106/21 |
| 4,232,552 | 11/1980 | Hof et al. | 73/356 |
| 4,299,727 | 11/1981 | Hof et al. | 73/356 |

OTHER PUBLICATIONS

J. of Polymer Sci., vol. 17, pp. 139–145 (1979).
J. of Applied Sci., vol. 19, pp. 713–714 (1975).
J. of Applied Polymer Sci., vol. 18, pp. 1225–1232 (1974).
Journ. of Polymer Sci., vol. 11, pp. 1927–1937 (1973).
J. of American Chemical Society, vol. 100, pp. 6513–6515 (1978).

Primary Examiner—Lorenzo B. Hayes
Assistant Examiner—Amelia B. Yarbrough

[57] ABSTRACT

A thermochromic material is described which comprises (a) an electron-donating, chromatic organic compound, (b) a compound capable of reversibly accepting an electron or electrons from the electron-donating, chromatic organic compound, (c) a compound controlling the temperature and sensitivity of coloration/decoloration of the thermochromic material and (d) a N-radical, P-radical, O-radical or S-radical cationic compound having an aromatic ring or rings which improves by light-fastness.

6 Claims, 4 Drawing Figures

THERMOCHROMIC MATERIALS

FIELD OF THE INVENTION

The present invention relates to thermochromic materials exhibiting a sharp and reversible metachromatism and having improved light-fastness.

BACKGROUND OF THE INVENTION

Conventional thermochromic materials as described in, for example, U.S. Pat. No. 4,028,118 (which corresponds to British Pat. No. 1,405,701, French Patent No. 7,319,876 and German Patent Application (OLS) 2,327,723), are not suitable for outdoor applications since they contain, as a colorforming component, an electron-donating, chromatic organic compound which is generally of low light-fastness and, therefore, they are readily subject to fading on exposure to sunlight.

SUMMARY OF THE INVENTION

The object of the invention is to provide reversible thermochromic materials having improved light-fastness.

The present invention, therefore, provides a thermochromic material comprising: (a) an electron-donating, chromatic organic compound; (b) a compound capable of reversibly accepting an electron or electrons from the electron-donating, chromatic organic compound; (c) a compound controlling the temperature and sensitivity of coloration/decoloration of the thermochromic material; and (d) a N-, P-, O- or S-containing radical cationic compound having an aromatic ring or rings.

BRIEF DESCRIPTION OF THE DRAWINGS

The accompanying drawings show spectrum of reflectance observed before and after exposing thermochromic material samples of the present invention and for comparison to sun light for a predetermined period.

DETAILED DESCRIPTION OF THE INVENTION

Figure 1:
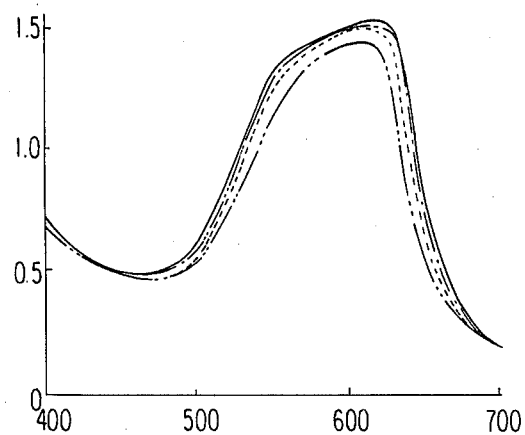
FIGS. 1 and 2 show spectra of the samples of Examples 2 and 106, respectively.

In brief, the present invention is based on the discovery that addition of component (d)—the compound selected from the group consisting of N-, P-, O- and S-containing radical cationic compounds containing an aromatic ring or rings—to a thermochromic material comprising the above described components (a), (b) and (c) greatly increases the light-fastness of the resulting thermochromic material without deterioration of the thermochromic ability thereof.

As a result of various investigations to stabilize the electron-donating, chromatic organic compound on the ground that the light-fastness of the electron-donating, chromatic organic compound is the most significant area for improvement of the light-fastness of the thermochromic material comprising the above components (a), (b) and (c), it has been found that cationic radical compounds exhibit a specific stabilization action, though anionic and neutral radical compounds exhibit no stabilization action, and, further, that of the cationic radical compounds, only N-, P-, O- and S-containing radical cationic compounds (hereinafter refered to as "N-, P-, O- and S-radical cationic compounds") having an aromatic ring or rings have such stabilization effects.

Since N-, P-, O- and S-radical cationic compounds have a planar structure, unpaired electrons in the compounds are delocalized by resonance of the $\pi$-electron system and, therefore, the compounds are stabilized. It is, therefore, considered that the cationic radical compound and the electron-donating, chromatic organic compound overlap each other when they are in parallel with each other, causing a mutual interaction between their $\pi$-electron systems, which leads to the electron-donating, chromatic organic compound entering a stable state where it is not decomposed by radiant energy. It is also considered that the mutual interaction is further enhanced when the electron-donating, chromatic organic compound is in the state of coloration since all aromatic rings in the molecule are positioned on the same plane.

In order to achieve such stabilization, it is necessary to introduce compounds which initiate the above described mutual interaction with the electron-donating, chromatic organic compound. Since the compound must approach to the electron cloud on the electron-donating, chromatic organic compound in both the colored and uncolored states, those compounds having a reduced number of electrons easily approach thereto. It is considered, therefore, that cationic radical compounds approach to the electron cloud on the electron-donating, chromatic organic compound compared more easily than other radical compounds.

From the viewpoint of stability, it is believed that only a very limited number of neutral and anionic radical compounds are stable in a composition comprising the above described components (a), (b) and (c). It is necessary for cationic radical compounds to contain therein elements having a single pair of electrons, such as elements belonging to Groups V and VI of the long form Periodic Table, in order that they can exist in stable fashion in a composition as described. In the case of Group VII elements of the long form Periodic Table, such as halogens, it is considered that the formation of stable cationic radicals is difficult since the elements have too high an ionization potential. Thus, only N-, P-, O- and S-radical cationic compounds having an aromatic ring or rings have the desired effect.

While it is considered that the thermochromatic material of the invention is markedly improved in light-fastness according to the above mechanism, the invention is not limited by the above described theoretical consideration.

It is essential in the present invention to use N-, P-, O- and/or S-radical cationic compounds.

N-Radical cationic compounds containing an aromatic ring or rings include aminium salts and diimonium salts, for example, aryl aminium salts, diaryl aminium salts, triaryl aminium salts, tetraarylquinone diimonium salts, diarylquinone diimonium salts, tetraaryl diphenoquinone diimonium salts, diaryl diphenoquinone diimonium salts, N-arylpyrolinium salts, tetraaryl hydrazinium salts and N-arylphenothiazinium salts.

The aminium salts can be represented by the following general formula (N-I):

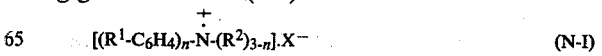

$$[(R^1\text{-}C_6H_4)_n\text{-}\overset{+}{N}\text{-}(R^2)_{3-n}]\cdot X^- \qquad (N\text{-}I)$$

wherein
n=1, 2 or 3;

R¹=a hydrogen atom, an alkyl group (containing 1 to 18 carbon atoms), or a dialkylamino group (each alkyl group thereof containing 1 to 18 carbon atoms);

R²=a hydrogen atom, an alkyl group (containing 1 to 18 carbon atoms), or a di(substituted phenyl) amino group (the substituent including a hydrogen atom and an alkyl group containing 1 to 18 carbon atoms), provided that when n=1, two R² groups may be combined to form the following groups:

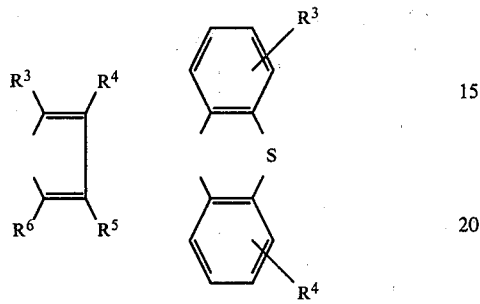

(wherein R³, R⁴, R⁵ and R⁶=a hydrogen atom, or an alkyl group (containing 1 to 18 carbon atoms)); and X⁻ =perchlorate (ClO₄⁻), fluoroborate (BF₄⁻), trichloroacetate (CCl₃CCO⁻), trifluoroacetate (CF₃COO⁻), picrate ((NO₂)₃C₆H₂O⁻), hexafluoroarsenate (AsF₆⁻), hexachloroantimonate (SbCl₆⁻), hexafluoroantimonate (SbF₆⁻), benzenesulfonate (C₆H₅SO₃⁻), alkylsulfonate (RSO₃⁻, the alkyl group thereof containing 1 to 18 carbon atoms), phosphate (PO₄³⁻), sulfate (SO₄²⁻), chloride (Cl⁻) or bromide (Br⁻).

The diimonium salts can be represented by the following general formula (N-II):

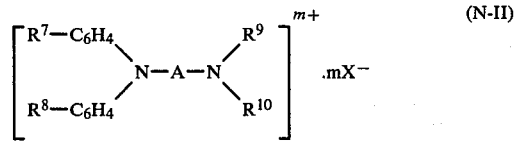

wherein

A = 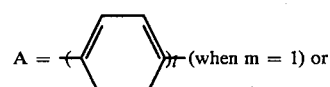 (when m = 1) or

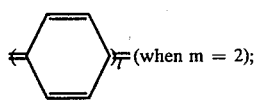 (when m = 2);

l = 1 or 2;
m = 1 or 2;

R⁷=a hydrogen atom, an alkyl group (containing 1 to 18 carbon atoms), a dialkylamino group (each alkyl group thereof containing 1 to 18 carbon atoms) or a diethanolamino group;

R⁸=a hydrogen atom, an alkyl group (containing 1 to 18 carbon atoms), a dialkylamino group (each alkyl group thereof containing 1 to 18 carbon atoms) or a diethanolamino group;

R⁹=a phenyl group, an alkyl group (containing 1 to 18 carbon atoms), a 4-dialkylaminophenyl group (each alkyl group thereof containing 1 to 18 carbon atoms) or a 4-diethanolaminophenyl group;

R¹⁰=a phenyl group, an alkyl group (containing 1 to 18 carbon atoms), a 4-dialkylaminophenyl group (each alkyl group thereof containing 1 to 18 carbon atoms) or a 4-diethanolaminophenyl group; and X⁻ =the same as for the general formula (N-I).

Aryl aminium salts which can be used include various compounds, for example, those compounds represented by the general formulae shown below:

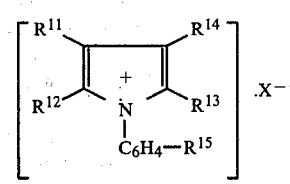

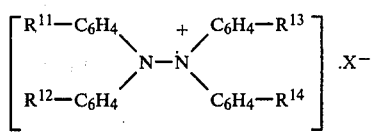

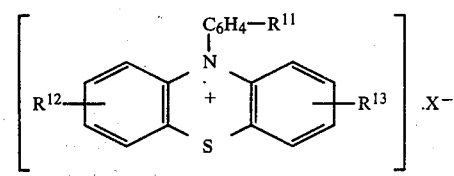

wherein

R¹¹, R¹², R¹³, R¹⁴ and R¹⁵=a hydrogen atom or an alkyl group (containing 1 to 18 carbon atoms); and X⁻ =the same as for the general formula (N-I).

Examples of suitable N-radical cationic compounds are given below.

Tris(p-dimethylaminophenyl)aminium perchlorate, tris(p-diethylaminophenyl)aminium hexafluoroantimonate, tris(p-di-n-butylaminophenyl)aminium hexafluoroarsenate, bis(p-diethylaminophenyl)ethylaminium fluoroborate, p-di-n-butylaminophenyl-di-n-butylaminium hexafluoroantimonate, bis(p-diethylaminophenyl)[N,N-bis-(p-diethylaminophenyl)-p-aminophenyl]aminium hexafluoroarsenate, bis(p-di-n-butylaminophenyl)[N,N-bis-(p-diethylaminophenyl)-p-aminophenyl]-aminium hexafluoroantimonate, bis(p-di-n-octylaminophenyl)-[N,N-bis-(p-di-n-octylaminophenyl)-p-aminophenyl] aminium fluoroborate, N,N-bis(p-diethylaminophenyl)-N',N'-diethyl-p-benzoquinone-bis(iminiumtrifluoroacetate), N,N,N',N'-tetrakis(p-di-n-butylaminophenyl)-p-benzoquinone-bis-(imoniumhexafluoroantimonate), N,N,N',N'-tetrakis(p-di-butylaminophenyl)-p-diphenoquinone-bis(imoniumhexafluoroantimonate), pentaphenylpyrrolinium fluoroborate, tetrakis(p-tolyl)hydrazidinium hexachloroantimonate, N-phenylphenothiazinium perchlorate, N-phenyl-2-methyl-7-chlorophenothiazinium hexafluoroantimonate, bis(p-di-n-butylaminophenyl)[N,N-bis(p-di-n-butylaminophenyl)4'-aminobiphenylyl]aminium hexafluoroantimonate and the like.

P-Radical cationic compounds having an aromatic ring or rings include arylphosphinium salts, diarylphosphinium salts, and triarylphosphinium salts.

These P-radical cationic compounds can be represented by the following general formula (P-I):

  (P-I)

wherein
p = 1, 2 or 3;
$R^{21}$ = a hydrogen atom, an alkyl group (containing 1 to 18 carbon atoms) or a dialkylamino group (each alkyl group thereof containing 1 to 18 carbon atoms);
$R^{22}$ = a hydrogen atom, or an alkyl group (containing 1 to 18 carbon atoms); and
$X^-$ = the same as for the general formula (N-I).

Examples of suitable P-radical cationic compounds are given below.

Tris(p-dimethylaminophenyl)phosphinium perchlorate, tris(p-diethylaminophenyl)phosphinium fluoroborate, tris(p-di-n-butylaminophenyl)phosphinium hexafluoroantimonate, tris(p-di-n-octylaminophenyl)phosphinium hexafluoroarsenate, bis(p-diethylaminophenyl)ethylphosphinium picrate, bis(p-di-n-butylaminophenyl)-n-butylphosphinium hexafluoroantimonate and p-diethylaminophenyldiethylphosphinium hexafluoroarsenate.

O-Radical cationic compounds having an aromatic ring or rings include dibenzo-p-dioxinium salts and aryloxinium salts.

These compounds can be represented by the following general formulae (O-I) and (O-II):

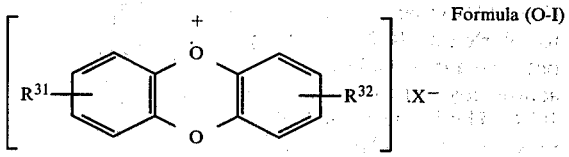 Formula (O-I)

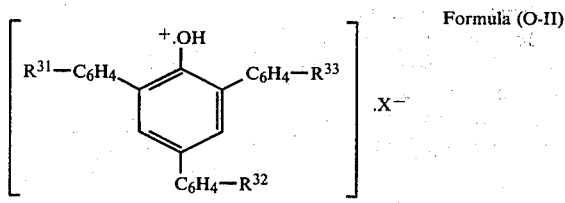 Formula (O-II)

wherein
$R^{31}$, $R^{32}$ and $R^{33}$ = a hydrogen atom or an alkyl group (containing 1 to 18 carbon atoms); and
$X^-$ = the same as for the general formula (N-I).

Examples of suitable O-radical cationic compounds are given below.

Dibenzo-p-dioxinium perchlorate, dibenzo-p-dioxinium hexafluoroantimonate, 2-methyldibenzo-p-dioxinium fluoroborate, 2-methyl-7-chlorodibenzo-p-dioxinium picrate, 2,7-dimethyldibenzo-p-dioxinium hexafluoroarsenate, 2,4,6-tris(4-methylphenyl)phenoxinium hexachloroantimonate, and the like.

S-Radical cationic compounds include dithiin cations, benzodithiin cations, thianthrene cations, phenoxanthiin cations, arylthioether cations, and alkylthiobenzene cations.

These compounds can be represented by the following general formulae (S-I), (S-II) and (S-III):

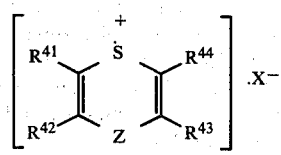 Formula (S-I)

wherein
Z = S or O;
$R^{41}$, $R^{42}$, $R^{43}$ and $R^{44}$ = a hydrogen atom, an alkyl group (containing 1 to 18 carbon atoms), a phenyl group or halogen (e.g., Cl, Br, I, F), or

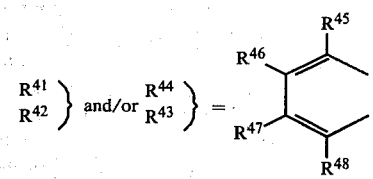

$R^{45}$, $R^{46}$, $R^{47}$ and $R^{48}$ = a hydrogen atom, an alkyl group (containing 1 to 18 carbon atoms) or halogen (e.g., Cl, Br, I, F).

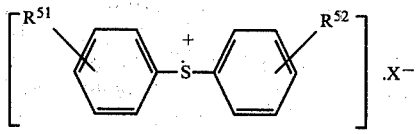 Formula (S-II)

wherein
$R^{51}$ and $R^{52}$ = a hydrogen atom, an alkyl group (containing 1 to 18 carbon atoms) or an alkoxy group (containing 1 to 18 carbon atoms).

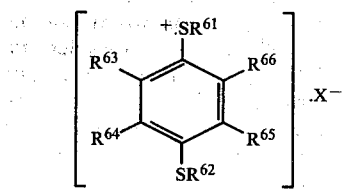 Formula (S-III)

wherein
$R^{61}$ and $R^{62}$ = an alkyl group (containing 1 to 18 carbon atoms);
$R^{63}$ and $R^{65}$ = a hydrogen atom, an alkyl group (containing 1 to 18 carbon atoms) or an alkylthio group (containing 1 to 18 carbon atoms);
$R^{64}$ and $R^{66}$ = a hydrogen atom or an alkyl group (containing 1 to 18 carbon atoms).

In general formulae (S-I), (S-II) and (S-III) above:
$X^-$ = the same as for the general formula (N-I).

Examples of suitable S-radical cationic compounds are given below.

1,4-Dithiin cation perchlorate, 2,5-dimethyl-1,4-dithiin cation fluoroborate, 2,3,5,6-tetramethyl-1,4-dithiin cation hexafluoroantimonate, 6,7-diethyl-1,4-benodithiin cation hexafluoroarsenate, 1,4-benzodithiin cation picrate, thianthrene cation hexafluoroantimonate, 2,7-dimethylthianthrene cation hexachloroantimonate, 2,7-dichlorothianthrene cation fluoroborate, phenoxanthiin cation perchlorate, 2,7-dimethylphenoxanthiin cation trifluoroacetate, 2-ethyl-7-chlorophenoxanthiin cation hexafluoroarsenate, bis(4-methylphenyl)sulfide cation fluoroborate, bis(4-n-butylphenyl)sulfide cation hexafluoroantimonate, 1,4-bis(methylthio)benzene cation perchlorate, 1,4-bis(n-butylthio)benzene cation hexafluoroarsenate, 1,2,4,5-tetrakis(ethylthio)benzene cation hexachloroantimonate, and 2,5-dimethyl-1,4-bis(n-butylthio)benzene cation fluoroborate.

Of these N-, P-, O- and S-radical cationic compounds, aminium salts represented by the general formula (N-I) and diimonium salts represented by the general formula (N-II) are preferred. Aminium perchlorates, diimonium perchlorates, aminium trifluoroacetates, diimonium trifluoroacetates, aminium hexafluoroarsenates, diimonium hexafluoroarsenates, aminium hexachloroantimonates, diimonium hexachloroantimonates, aminium hexafluoroantimonates, diimonium hexafluoroantimonates, aminium fluoroborates and diimonium fluoroborates are more preferred. Aminium hexafluoroarsenates, diimonium hexafluoroarsenates, aminium hexafluoroantimonates, diimonium hexafluoroantimonates, aminium fluoroborates and diimonium fluoroborates are most preferred. Specific preferred aminium and diimonium salts are tris(p-dialkylaminophenyl)aminium X−, bis(p-dialkylaminophenyl)[N,N-bis(p-dialkylaminophenyl)-p-aminophenyl]aminium X−, N,N-bis(p-dialkylaminophenyl)-N',N'-dialkyl-p-benzoquinone bis(imonium X−), N,N,N',N'-tetrakis(p-dialkylaminophenyl)-p-benzoquinone bis(imonium X−), N,N,N',N'-tetrakis(p-dialkylaminophenyl)-p-diphenoquinonebis(imonium X−) and bis(p-dialkylaminophenyl)[N,N-bis(p-dialkylaminophenyl)-4'-aminobiphenylyl]aminium X−, wherein each alkyl group containing 1 to 8 carbon atoms and X− represents fluoroborate (BF$_4^-$), hexafluoroarsenate (AsF$_6^-$) and hexafluoroantimonate (SbF$_6^-$).

The light-fastness of the thermochromic material of the invention comprising components (a), (b), (c) and (d) is generally increased 10 to 50 times that of a conventional thermochromic material comprising components (a), (b) and (c) alone, though such varies depending on the structure of the electron-donating, chromatic organic compound and irradiation conditions, for example, the type of light source to which the material is exposed, and the atmosphere in which it is exposed to the light source.

The thermochromic material of the invention has the following advantages:

(1) The temperature of coloration/decoloration is within the range of from −100° C. to +200° C.; that is, metachromatism occurs at ordinary ambient temperatures, at temperatures of 0° C. or lower, especially minus several ten degrees (°C.) and at elevated temperatures.

(2) The combination of the temperature of coloration/decoloration and the type of color can be freely and optionally chosen, and it is possible to reversibly change from Color I to Color II by the addition of conventional dyes, pigments, etc.

(3) It is possible to pass light therethrough or to prevent the passage of light therethrough.

Although the optimum ratio of components (a), (b), (c) and (d) in the thermochromatic material of the invention varies depending on the intensity of the color desired, the temperature of coloration/decoloration, the degree of light-fastness required, and the type of each component, the desired characteristics are usually obtained within the following range:

| | (weight ratio) |
|---|---|
| Component (a): Electron-donating, chromatic organic compound | 1 |
| Component (b): One or more compounds selected from phenolic hydroxy group-containing compounds and derivatives thereof and carboxyl group-containing compounds and derivatives thereof | about 1/10 to 10 |
| Compounds (c): One or more compounds selected from alcohols, esters, ketones, ethers, acid amides and carboxylic acids | about 1 to 100 |
| Compounds (d): One or more compounds selected from N—, P—, O— and S—radical cationic compounds | about 1/100 to 5 |

The thermochromatic material of the invention may be microencapsulated by known techniques as described, for example, in U.S. Pat. Nos. 2,800,457, 3,015,128, 3,016,308, 3,161,602, 3,173,878 3,202,533 and 3,429,827, and British Pat. No. 989,264. Microencapsulation yields another advantage of the invention; that is, it permits one to mix a plurality of thermochromic materials forming different colors at different temperatures without bringing them in direct contact with one another while protecting each thermochromic material by capsule walls so that it exhibits its own thermochromic capability.

For example, if (1) a thermochromic material changing from yellow to colorless at 10° C., (2) a thermochromic material changing from blue to colorless at 20° C., and (3) a thermochromic material changing from red to colorless at 30° C. are merely mixed together, there is obtained a thermochromic material exhibiting dim metachromatism of from black to colorless at about 10° to 20° C. This is due to the fact that thermochromic materials (1), (2) and (3) come into direct contact with one another, mutual influence each other, and result in the formation of a mixed color and a loss of sharpness of coloration/decoloration.

In contrast, when thermochromic materials (1), (2) and (3) are independently microencapsulated in microcapsules having a size of 30 μm or less and thereafter mixed together to prepare a thermochromic material, the thermochromic material shows multiple metachromatism in that it turns black below 10° C., purple at 10° to 20° C., red at 20° to 30° C., and colorless above 30° C., whereas when it is cooled from above 30° C., it turns from colorless to red, from red to purple, and from purple to black. Based on the same principle, various metachromatisms can be obtained and the coloration/decoloration is sharp. This is, as described above, due to the fact that the microencapsulated thermochromic materials are separated from one another by capsule walls and they exhibit their own metachromatism independently.

The above multiple metachromatism provides the following practical applications:

(1) Using microencapsulated thermochromic materials exhibiting metachromatisms of the three primary colors magenta, cyan and yellow and black, it is possible to perform printing having the same tone as photograph, etc. It is also, of course, possible to control the coloration/decoloration by changing the temperature of coloration/decoloration so that the photograph is rendered visible or invisible.

(2) By printing a photograph, for example, using conventional black dyes, and then printing microencapsulated thermochromic materials having magenta, cyan and yellow dyes, it is possible to prepare a black and white photograph, and a color photograph as the total picture.

(3) Coloration/decoloration can be performed at the same time or can be performed stepwise using materials which have different temperatures of coloration/decoloration.

Further, since the thermochromic materials are protected by capsule walls, even when they are brought into contact with one another or with other reactive substances, the thermochromic properties thereof are not deteriorated. Therefore, their field of application is greatly broadened. For example, even when such microencapsulated thermochromic materials are contacted with acidic substances, alkaline substances, peroxides or other chemically active substances, the thermochromic properties thereof are not deteriorated.

Microencapsulation can be performed by any conventional microencapsulation technique, such as interfacial polymerization as described in U.S. Pat. Nos. 3,429,827 and 3,167,602, in situ polymerization as described in British Pat. No. 989,264, orifice method as described in U.S. Pat. No. 3,015,128, coacervation from an aqueous solution system as described in U.S. Pat. Nos. 2,800,457 and 3,116,206, coacervation from an organic solvent solution system as described in U.S. Pat. No. 3,173,872, meltable dispersion process as described in U.S. Pat. No. 3,161,602, air suspending coating method as described in U.S. Pat. No. 3,202,533, spray drying as described in U.S. Pat. No. 3,016,308 and the like. These conventional techniques can be chosen appropriately depending on the purpose for which the thermochromic material is used.

Microcapsules used in the present invention have a size of 30 μm or less, preferably 2 to 30 μm and most preferably 5 to 15 μm.

The thermochromic material of the invention has various advantages over conventional thermochromic materials, in particular, it is superior in that light-fastness is markedly improved by improving the light-fastness of the electron-donating, chromatic organic compound. Thus, the thermochromatic material of the invention is very useful for practical use and in industry.

Hereinafter the compounds for use in the invention are explained in more detail.

The electron-donating, chromatic organic compound as used herein (i.e., component (a)) is a colorless or light-colored organic compound which is capable of undergoing coloration on denoting an electron to an electron-acceptor.

Electron-donating, chromatic organic compounds which can be used in the invention include diaryl phthalides, aryl phthalides, indolylphthalides, polyarylcarbinols, leucoauramines, acylauramines, arylauramines, rhodamine B lactams, indolines, spiropyrans, fluorans, thiofluorans, phenothiazines, triphenylmethanes, diarylarylfurans, spiroxanthenearylfurans, and chromenoindoles.

Examples of suitable electron-donating, chromatic organic compounds are given below.

Crystal Violet lactone, Malachite Green lactone, Michler's hydrol, Crystal Violet carbinol, Malachite Green carbinol, N-(2,3-dichlorophenyl)leucoauramine, N-benzoylauramine, Rhodamine B lactam, N-acetylauramine, N-phenylauramine, 2-(phenyliminoethylidene)-3,3-dimethyl-indoline, N-3,3-trimethylindolinobenzospiropyran, 8'-methyl-N-3,3- trimethylindolinobenzospiropyran, 3-diethylamino-6-methyl-7-chlorofluoran, 3-diethylamino-7-methoxyfluoran, 3-diethylamino-6-benzyloxyfluoran, 1,2-benz-6-diethylaminofluoran, 3,6-di-p-toluidino-4,5-dimethylfluoran-phenylhydrazido-γ-lactam, 3-amino-5-methylfluoran, 2-methyl-3-amino-6-methyl-7-methylfluoran, 2,3-butylene-6-di-n-butylaminofluoran, 3-diethylamino-7-anilinofluoran, 3-diethylamino-7-(paratoluidino) fluoran, 7-acetamino-3-diethylaminofluoran, 2-bromo-6-cyclohexylaminofluoran, 2,7-dichloro-3-methyl-6-n-butylaminofluoran, 3-diethylamino-6-methyl-7-dimethylamino-thiofluoran, 3-diethylamino-7-dibenzylamino-thiofluoran, 3,3-bis(1-ethyl-2-methyl-3-yl)phthalide, 3,3-bis(2-phenylindol-3-yl)phthalide, 3-(4-diethylaminophenyl)-3-(1-ethyl-2-methylindol-3-yl) phthalide, 3-(4-di-n-butylaminophenyl)-3-(2-phenylindol-3-yl) phthalide, 3-(duroridine-6'-yl)-3-(1'-methyl-2'-phenylindol-3'-yl)phthalide, 3-(1',2',3',4'-tetrahydroquinolin-6'-yl) 3-(1'-ethyl-2'-methyl-indol-3'-yl)phthalide, 3,3-bis(1-ethyl-2-methyl-indol-3-yl)-7-azaphthalide, 3-(diphenylamino)-3-(1-ethyl-2-methylindol-3-yl)phthalide, 3-[N-(4-ethoxyphenyl) N-phenylamino)-3-(1-ethyl-2-methylindol-3-yl)phthalide, 3-[4-(dimethylamino)phenyl]-3-[N,N-bis-(4-octylphenyl)amino]phthalide, 3-[4-(ethylbenzylamino)phenyl]-3-[N-(4-ethoxyphenyl) N-phenylamino]phthalide, 2,2-bis(p-N,N-dimethylaminophenyl) 2-H-naphtho[1,8-bc]furan, spiro-3,6-bis(dimethylamino) xanthen-9,2-(2H)-naphtho[1,8-bc]furan, 6,6-bis(4-dimethylaminophenyl)-6H-chromeno[4,3-b]indole and the like.

The component (b), i.e., the compound selected from phenolic hydroxy group-containing compounds and derivatives thereof and carboxyl group-containing compounds and derivatives thereof, is explained in more detail.

The phenolic hydroxy group-containing compounds and derivatives thereof include monophenols to polyphenols, and metal salts (such as, Na, K, Li, Ca, Zn, Zr, Al, Mg, Ni, Co, Sn, Cu, Fe, V, Ti, Pb and Mo) thereof. Examples of substituents include an alkyl group (containing 1 to 18 carbon atoms), an aryl group (such as, phenyl and naphthyl), an acyl group (such as, acetyl and benzoyl), an alkoxy- or aryloxy-carbonyl group (such as, methoxycarbonyl, phenoxycarbonyl), and halogen (such as, F, Cl, Br and I).

Examples of suitable materials are given below.

Tertiary-butylphenol, nonylphenol, dodecylphenol, styrenated phenols, 2,2'-methylenebis-(4-methyl-6-tert-butylphenol), α-naphthol, β-naphthol, hydroquinone monomethyl ether, guaiacol, eugenol, p-chlorophenol, p-bromophenol, o-chlorophenol, o-bromophenol, o-phenylphenol, p-phenylphenol, p-(p-chlorophenyl)-phenol, o-(o-chlorophenyl)phenol, methyl p-oxybenzoate, ethyl p-oxybenzoate, propyl p-oxybenzoate, butyl p-oxybenzoate, octyl p-oxybenzoate, dodecyl p-oxybenzoate, 3-isopropyl catechol, p-tert-butyl catechol, 4,4-methylenediphenol, 1,1-bis-(4-hydroxyphenyl)-cyclohexanone, 4,4'-butylidene-bis(6-tert-butyl-3-methylphenol), bisphenol A, bisphenol S, 1,2-dioxynaphthalene, 2,3-dioxynaphthalene, chlorocatechol, bromocatechol, 2,4-dihydroxybenzophenone, phenolphthalein, o-cresolphthalein, methyl protocatechuate, ethyl protocatechuate, propyl protocatechuate, octyl protocatechuate, dodecyl protocatechuate, 2,4,6-trioximethylbenzene, 2,3,4-trioxyethylbenzene, methyl gallate, ethyl gallate, propyl gallate, butyl gallate, hexyl gallate, octyl gallate, dodecyl gallate, cetyl gallate, stearyl gallate, 2,3,5-trioxynaphthalene, tannic acid, and phenol resins.

Metal salts of phenolic hydroxy group-containing compounds include the sodium, potassium, lithium, calcium, zinc, zirconium, aluminum, magnesium, nickel, cobalt, tin, copper, iron, vanadium, titanium, lead and molybdenum salts of the above described phenolic hydroxy group-containing compounds.

These metal salts of the phenolic hydroxy group-containing compounds can be prepared by reacting the phenolic compounds with oxides or hydroxides of the desired metal or by complex decomposition of phenolic compound alkali salts and the chloride of the desired metal. Alternatively, the desired compound can be prepared by heat-reaction of the phenolic compounds and the desired metal acetyl acetonate.

Carboxy group-containing compounds and derivatives thereof include monocarboxylic acids to polycarboxylic acids, anhydrides thereof and metal salts thereof in proviso that aliphatic acids having 6 or more carbon atoms are excluded. That is, the carboxyl group-containing compounds and derivative thereof include aromatic acids, aromatic acid anhydrides, aromatic acid metal salts, aliphatic acids having 2 to 4 carbon atoms, aliphatic acid anhydrides (where the aliphatic acid having 2 or more carbon atoms) and aliphatic acid metal salts (where the aliphatic acid having 2 or more carbon atoms). Suitable examples of such carboxy group-containing compounds, anhydride thereof and salts thereof are given below.

Acetic acid, propionic acid, butyric acid, monochloroacetic acid, monobromoacetic acid, monofluoroacetic acid, glucolic acid, hydroxypropionic acid, hydroxybutyric acid, lactic acid, pyruvic acid, oxalic acid, malonic acid, succinic acid, malic acid, tartaric acid, valeric acid, maleic acid, fumaric acid, benzoic acid, toluic acid, phenylacetic acid, p-tert-butylbenzoic acid, cinnamic acid, chlorobenzoic acid, bromobenzoic acid, ethoxybenzoic acid, mandelic acid, protocatechuic acid, vanilic acid, resorcinic acid, dioxybenzoic acid, dioxychlorobenzoic acid, gallic acid, naphthoic acid, hydroxynaphthoic acid, phthalic acid monoethyl phthalate, naphthalenedicarboxylic acid, monoethyl naphthalenedicarboxylate, trimellitic acid, pyromellitic acid and the like.

Carboxylic acid metal salts include the sodium, potassium, lithium, calcium, zinc, zirconium, aluminum, magnesium, nickel, cobalt, tin, copper, iron, vanadium, tin, lead, and molybdenum salts of the above described carboxylic acids.

The carboxylic acid metal salts can be prepared, for example, by the reaction of carboxylic acids and oxides or hydroxides of the desired metal, and the complex decomposition of carboxylic acid alkali salts and chlorides of the desired metal.

Carboxylic acid anhydrides include benzoic anhydride, phthalic anhydride, maleic anhydride, chlorendic anhydride, trimellitic anhydride, tetrachlorophthalic anhydride, hexahydrophthalic anhydride, iso-butyric anhydride, methoxyacetic anhydride, caprylic anhydride, oleic anhydride.

The component (c), i.e., the compound selected from alcohols, esters, ketones, ethers, acid amides and carboxylic acids, is explained in more detail.

Alcohols include monohydric alcohols to polyhydric alcohols (up to octahydric alcohol), and derivatives thereof (such as, halogen-substituted alcohol). Examples of suitable compounds are listed below.

n-Octyl alcohol, n-nonyl alcohol, n-decyl alcohol, n-lauryl alcohol, n-myristyl alcohol, n-cetyl alcohol, n-stearyl alcohol, n-eicosyl alcohol, n-docosyl alcohol, n-melissyl alcohol, isocetyl alcohol, isostearyl alcohol, isodocosyl alcohol, oleyl alcohol, cyclohexanol, cyclopentanol, benzyl alcohol, cinnamyl alcohol, ethylene glycol, diethylene glycol, triethylene glycol, polyethylene glycol, propylene glycol, butylene glycol, hexylene glycol, cyclohexane-1,4-diol, trimethylolpropane, 1,2,6-hexanetriol, pentaerythritol, sorbitol, mannitol 12-bromostearyl alcohol, 9,10-dichlorostearyl alcohol and the like.

Examples of suitable esters are given below.

Octyl acetate, lauryl propionate, phenyl propionate, lauryl caproate, amyl capriate, octyl capriate, butyl laurate, octyl laurate, dodecyl laurate, myristyl laurate, cetyl laurate, stearyl laurate, butyl myristate, octyl myristate, myristyl myristate, cetyl myristate, stearyl myristate, butyl palmitate, octyl palmitate, lauryl palmitate, myristyl palmitate, cetyl palmitate, steary palmitate, methyl stearate, butyl stearate, lauryl stearate, myristyl stearate, cetyl stearate, stearyl stearate, butyl behenate, lauryl behenate, lauryl oleate, cetyl oleate, butyl benzoate, phenyl benzoate, ethyl acetoacetate, butyl acrylate, stearyl acrylate, dibutyl oxalate, distearyl oxalate, dicetyl malonate, dibutyl tartarate, dibutyl sebacate, distearyl sebacate, dimyristyl phthalate, distearyl phthalate, dilauryl fumarate, dicetyl maleate, trioctyl citrate, 12-hydroxystearic acid triglyceride, castor oil, cetyl dioxystearate, butyl 12-hydroxystearate, stearyl 12-hydroxystearate, lauryl 12-methoxystearate and the like.

Examples of suitable ketones are given below.

Diethyl ketone, ethyl butyl ketone, methyl hexyl ketone, dimethyl oxide, cyclohexanone, methylcyclohexanone, acetophenone, propiophenone, benzophenone, 2,4-pentanedion, acetonitrile acetone, diacetone alcohol, dilauryl ketone, dimyristyl ketone, dicetyl ketone, distearyl ketone, ketone wax and the like.

Examples of suitable ethers are given below.

Butyl ether, hexyl ether, dilauryl ether, dimyristyl ether, dicetyl ether, distearyl ether, diisopropyl benzyl ether, diphenyl ether, dioxane, ethylene glycol dibutyl ether, ethylene glycol dicetyl ether, ethylene glycol distearyl ether, diethylene glycol dibutyl ether, diethylene glycol dimyristyl ether, diethylene glycol distearyl ether, ethylene glycol diphenyl ether, ethylene glycol monophenyl ether, ethylene glycol monolauryl ether, ethylene glycol monostearyl ether and the like.

Examples of suitable acid amides are given below.

Acetamide, butyric acid amide, caproic acid amide, capric acid amide, caprylic acid amide, lauric acid amide, myristic acid amide, palmitic acid amide, stearic acid amide, behenic acid amide, oleic acid amide, erucic acid amide, benzamide, capric acid anilide, stearic acid anilide, oleic acid anilide, myristic acid N-methylamide, palmitic acid N-ethylamide, stearic acid N-butylamide, adipic acid amide, adipic acid N-butylamide, succinic acid N-octylamide and the like.

Carboxylic acids include aliphatic carboxylic acids having 6 or more carbon atoms. Examples of suitable compounds are listed below.

Caproic acid, caprylic acid, lauric acid, myristic acid, palmitic acid, stearic acid, arachic acid, isostearic acid, behenic acid, crotonic acid, oleic acid, elaidic acid, linolic acid, linolenic acid, ricinolic acid, 12-hydroxystearic acid, adipic acid, suberic acid, sebacic acid, naphthenic acid and the like.

In another embodiment of the invention, the thermochromic material of the invention comprises (a) an electron-donating, chromatic organic compound, (b) one or more compounds selected from phenolic hydroxy group-containing compounds and salts thereof, and carboxyl group-containing compounds, anhydrides thereof and salts thereof, (c) one or more compounds selected from alcohols, esters, ketones, ethers, acid amides and carboxylic acids, (d) one or more compounds selected from N-radical, P-radical, O-radical and S-radical cationic compounds having an aromatic ring or rings, and (e) one or more photostabilizers.

While the light-fastness of the electron-donating, chromatic organic compound is greatly stabilized by the addition of one or more of the N-radical, P-radical, O-radical and S-radical cationic compounds having an aromatic ring or rings, it has been found that these cationic compounds per se tend to deteriorate gradually by irradiation with light over long periods of time. Thus, the light-fastness of the electron-donating, chromatic organic compound is gradually degraded by the deterioration of the cationic compound and, finally, the thermochromic material begins to fade.

As a result of various investigations to prevent such deterioration of the cationic compound, it has been found that the addition of photo-stabilizers is unexpectedly effective for that purpose.

Photo-stabilizers alone are insufficient to increase the light-fastness of the thermochromic materials. However, when the photo-stabilizers are added to a thermochromic material with one or more of N-radical, P-radical, O-radical and S-radical cationic compounds having an aromatic ring or rings incorporated therein, the light fastness of the resulting thermochromic materials is increased 2 to four times that of a thermochromic material with no photostabilizer incorporated thereinto (20 to 50 times that of a thermochromic material comprising the above described components (a), (b) and (c) alone. This stabilization effect is unexpectedly great, and is believed to be due to a synergistic effect of the photo-stabilizer and the one or more of the N-radical, P-radical, O-radical and S-radical cationic compounds.

The amount of photo-stabilizer added is generally 0.5 to 10% by weight, preferably 2 to 8% by weight, based on the total weight of the thermochromic material (i.e., total weight of the components (a), (b), (c) and (d)).

Photo-stabilizers which can be used include ultraviolet light absorbers, visible light absorbers, antioxidants (including anti-aging agents), singlet oxygen quenchers, and super oxide anion quenchers.

Examples of suitable ultraviolet light absorbers include benzophenone-, salicylate-, benzotriazole-, and β,β-dibenzocyanoacrylate-based absorbers, such as 2,4-dihydroxybenzophenone, 2-hydroxy-4-methoxybenzophenone, 2-hydroxy-4-octoxybenzophenone, 2-hydroxy-4-dodecyloxybenzophenone, 2-hydroxy-4-octadecyloxybenzophenone, phenyl salicylate, p-tert-butylphenyl salycilate, p-octylphenyl salycilate, 2-(2'-hydroxy-5'-methyl-phenyl)benzotriazole, 2-(2'-hydroxy-3',5'-di-tert-butylphenyl)benzotriazole, 2-(2'-hydroxy-8'-tert-butyl-1',5'-methylphenyl)5-chlorobenzotriazole, 2-(2'-hydroxy-3',5'-di-tert-butylphenyl)-5-chlorobenzotriazole, 2-(2'-hydroxy-3',5'-tert-butylphenyl)-5-chlorobenzotriazole, 2-(2'-hydroxy-4'-octoxy-phenyl)benzotriazole, 2'-ethylhexyl-2-cyano-8-phenyl cinnamate, resorcinol monobenzoate and the like.

Examples of suitable visible light absorbers include dyes (such as, monoazo-, bisazo-, metal complex salt type monoazo-, anthraquinone-, phthalocyanine- and triphenylmethane-based dyes), pigments (such as, monoazo-, bisazo-, metal complex salt type monoazo-, anthraquinone-, indigo-, thionindigo-, phthalocyanine-, triphenylmethane and xanthene-based pigments), and other colored substances. Examples of dyes include C.I. Solvent Yellow 19, 21 and 61, C.I. Solvent Orange 5 and 6, C.I. Solvent Red 8 and 24, C.I. Solvent Violet 14 and 21, C.I. Solvent Blue 11 and 25, C.I. Solvent Black 5 and 123 and the like.

Examples of pigments include those indicated by Color Index Nos., 11680, 11730, 12710, 10325, 21090, 70600, 11725, 12060, 21110, 21165, 12120, 12490, 12500, 21205, 45170, 58055, 74160, 69810, 21180, 69800, 127755, 74265, 50440 and the like.

Antioxidants (including anti-aging agents) which can be used include hindered phenol-, hindered amine-, phosphite-, benzimidazole- and sulfide-based antioxidants, for example, 2,6-di-tert-butyl-4-methylphenol, 2,4,6-tritert-butylphenol, 2,2'-methylenebis(4-methyl-6-tert-butylphenol), 4,4'-isopropylidene-bisphenol, 2,6-bis(2'-hydroxy-3'-tertbutyl-5'-methylbenzyl)-4-methylphenol, 4,4'-thiobis-(3-methyl-6-tert-butylphenol), tetrakis[methylene(3,5-di-tertbutyl-4-hydroxyhydrocinnamate)]methane, p-hydroxyphenyl-3-naphthylamine, 2,2,4-trimethyl-1,2-dihydroxyquinoline, thiobis(β-naphthol), mercaptobenzothiazole, mercaptobenzimidazole, aldol-α-naphthylamine, bis-(2,2,6,6-tetramethyl-4-piperidyl)sebacate, 2,2,6,6-tetramethyl-4-piperidylbenzoate, dilauryl-8,8'-thiodipropionate, distearyl-8,8'-thiodipropionate, tris-(4-nonylphenol)phosphite and the like.

Singlet oxygen quenchers which can be used include carotenes, dienes, amines and nickel complexes, such as 1,4-diazabicyclo [2,2,2]octane (DABCO), β-carotene, 1,3-cyclohexadiene, 2-diethylaminomethylfuran, 2-phenylaminomethylfuran, 9-diethylaminomethylanthrathene, 5-diethylaminomethyl-6-phenyl-3,4-dihydroxypyran, nickel dimethyl dithiocarbamate, nickel dibutyl dithiocarbamate, nickel 3,5-di-tert-butyl-4-hydroxybenzyl o-ethylphosphate, nickel 3,5-di-tert-butyl-4-hydroxybenzyl o-butylphosphate, nickel-[2,2'-thiobis(4-tert-octylphenolate)](n-butylamine), nickel [2,2'-thiobis-(4-tert-octylphenolate](2-ethylexylamine), nickel bis[2,2'-thio-bis(4-tert-octylphenolate)], nickel bis[2,2'-sulfone-bis(4-octylphenolate)], nickel bis-(2-hydroxy-5-methoxyphenyl-N-n-butylaldoimine), nickel bis(dithiobenzyl), and nickel bis(dithiobiacetyl).

Super oxide anion quenchers which can be used include super oxide dimustase and complexes of cobalt (III) and nickel (II) as described in J. C. McCord and I. Fridorich, *J. Biol. Chem.*, vol. 244, pages 6049 and 6056 (1969).

If desired, the thermochromic material or microencapsulted thermochromic material may be used in combination with polymers (such as, hydrocarbon resin, acryl resin, vinylacetate resin, halogen-containing resin, diene resin, polyester resin, polyamide resin, polyurethane resin, epoxy resin, melamine resin and polyurea resin), auxiliary solvents (including diluents) (such as, high boiling point aromatic hydrocarbon solvents, waxes, terpene oils and fluorocarbon oils), and the like.

The thermochromic material or microencapsulated thermochromic material can be homogeneously dispersed in polymeric substances to prepare thermochromic polymer compositions without deterioration of the characteristics of the thermochromic material or microencapsulated thermochromic material, e.g., a thermocrhomic material can be added to a thermoplastic polymer (such as, polyethylene, polypropylene, polystyrene, polyvinylchloride, poly methyl methacrylate, polycarbonate and polyoxymethylene) which has been melted by heating and the mixture is kneaded homogeneously to prepare a thermoplastic thermochromic polymer composition. Similarly, a thermosetting polymer (such as, epoxy resin, polyurethane resin, melamine resin, polyurea resin and phenol resin) can be homogeneously kneaded with a thermochromic material and then polymerized by addition of a hardener (for example, amines and acid anhydride (in case of epoxy resin)), a catalyst (for example, phosphoric acid and oxalic acid (incase of phenol resin)) or the like, or by application of heat (for example, at normal temperature for 2 days; at 80° C. for 2 hours; and at 120° C. for 1 hour) to prepare a thermosetting thermochromic polymer composition.

These polymer compositions can be shaped into the desired article, for example, a block, a film, a filament, a fine particle, a rubber-like elastomer or a liquid having thermochromic properties.

(1) By incorporating the thermochromic material into polyethylene, polypropylene, polystyrene, polymethyl methacrylate, an unsaturated polyester(s), an epoxy resin, an acrylic resin, polyurethane or the like, a translucent or transparent block having thermochromic properties is obtained.

(2) By mixing the thermochromic material with polyethylene, polyvinyldene chloride, an inomer, or the like, a film (thickness of 5 mm or less) having thermochromic properties can be obtained.

(3) By mixing the thermochromic material with polypropylene, polyamide or the like, a filament having thermochromic properties can be obtained.

(4) By mixing the thermochromic material with polyethylene, polyacetal or the like, a fine particle (particle size of 5 mm or less) having thermochromic properties can be obtained.

(5) By mixing the thermochromic material with butyl rubber, polyisobutylene, an ethylene-propylene copolymer, or the like, a rubber-like elastomer having thermochromic properties can be obtained.

(6) By mixing the thermochromic material with low polymerization degree polybutene, polyisobutylene or the like, a liquid having thermochromic properties can be obtained.

The polymer compositions in the above forms can be used in various applications, such as molding, film-forming, spinning, coating, and binding.

The amount of the thermochromic material necessary to provide the desired thermochromic properties can be changed within a wide range, and it varies depending on the type of the polymer used and the use thereof. Usually, the amount of the thermochromic material added is from about 0.1% by weight to about 40% by weight based on the total weight of the composition to provide the desired characteristics (i.e., total weight of the polymer used and the thermochromic material used). The range of about 0.5 to 20% by weight is preferred.

As the polymers used for the formation of the thermochromic polymer compositions of this invention, there can be mentioned, for example, hydrocarbon resins such as polyethylene, polypropylene, polybutene, polyisobutylene, polystyrene, coumarone-indene resins, terpene resins, ethylene-propylene copolymer resins; acrylic resins such as polymethyl acrylate, polyethyl acrylate, polybutyl acrylate, polymethyl methacrylate, polyethyl methacrylate and polyacrylonitrile; vinyl acetate resins and derivatives thereof such as polyvinyl acetal, polyvinyl butyral, vinyl acetatevinyl chloride copolymer resins and vinyl acetate-ethylene copolymer resins; halogen-containing resins such as polyvinyl chloride, polyvinylidene chloride, chlorinated polyethylene and chlorinated polypropylene; diene type polymers such as butadiene type synthetic rubber, chloroprene type synthetic rubber and isoprene type synthetic rubber; polyester resins such as saturated alkyd resins, Glyptal resins, terephthalate resins, unsaturated polyester resins, allyl resins and polycarbonate resins; and other resinous substances such as polyamide resins, silicon resins, polyvinyl ether resins, furan resins, polysulfide resins, epoxy resins, polyurethane resins, melamine resins, polyurea resins and metaxylene resins.

Additives can be added to the polymer composition of the invention to improve the properties thereof. Typical examples of such additives are antioxidants, ultraviolet light absorbers, inorganic fillers, pigments, plasticizers, lubricants, antistatic agents, and antiblocking agents.

Examples of suitable auxiliary solvents and diluents include high boiling point aromatic hydrocarbon solvents (such as, triaryldimethane, alkylnaphthalene, alkylbenzene and biphenyl), fluid paraffins, chlorinated paraffins, microcrystalline waxes, paraffin waxes, ceresin and fluorocarbon oils.

The thermochromic material or microencapsulated thermochromic material of the invention can be used in various applications, for example, (1) a thermochromic printing ink, (2) a thermochromic writing instrument, (3) a thermochromic paint, (4) a thermochromic sheet, (5) a thermochromic wrapping material, etc.

(1) Thermochromic Printing Inks

Thermochromic printing inks can be prepared by dissolving or dispersing the thermochromic material or microencapsulated thermochromic material in a printing ink vehicle. By coating a support, such as paper, a synthetic paper, a plastic film, cloth, a metal plate, etc., partially or entirely with the thermochromic printing ink, a thermochromic printing material can be obtained without deterioration of the inherent thermochromic characteristics of the thermochromic material. The thermochromic printed material is excellent, and, of course, is advantageous over conventional thermochromic printed materials.

The thermochromic printed material changes its color according to changes in temperature, and, thus, it can be used as an ordinary household material or industrial material with or without the application of additional processing.

Using the thermochromic material or microencapsulated thermochromic material of the invention, a variety of printing inks can be prepared, including cooling-solidifying type, evaporation-drying type, permeation-drying type, precipitation-drying type, gelation-drying type, oxidative polymerization type, and thermosetting type printing inks. These printing inks contain vehicles such as a natural resin, a modified natural resin, a synthetic resin, a wax, and a solvent.

In preparing printing inks using the thermochromic material or microencapsulated thermochromic material of the invention, the amount of the thermochromic material necessary to obtain the desired thermochromic properties can be changed within wide ranges; it varies depending on the type of the vehicle and the use of the printing ink. Usually, the amount of the thermochromic material used is sufficient if it is from about 1% by weight to about 50% by weight, preferably from about 5% by weight to about 40% by weight, based on the total weight of the printing ink, within which range the desired thermochromic properties are excellently exhibited.

Conventional additives which are usually used to improve conventional printing inks can be added to the printing ink composition of the invention. Typical examples of such additives include antioxidants, ultraviolet light absorbers, pigments, plasticizers, and antiblocking agents.

As described hereinabove, printing inks can be prepared using the thermochromic material of the invention and vehicles which are appropriately selected depending on the type of thermochromic material and the use of the resulting printing ink. By applying the printing inks by letterpress printing, intaglio printing, lithographic printing, screen printing, and so forth. the desired printed material can be prepared.

(2) Thermochromic Writing Instruments

Writing instruments such as a felt pen, a ballpoint pen, and a coloring material can be prepared using a liquid material which is prepared by dissolving or dispersing the thermochromic material or microencapsulated thermochromic material of the invention in a solvent. Alternatively, writing instruments such as a crayon and a pencil can be prepared using a solic material which is prepared by solidifying the thermochromic material or microencapsulated thermochromic material by the use of a suitable vehicle. In preparing such writing instruments, the thermochromic characteristics of the present thermochromic material are not deteriorated at all.

Such thermochromic writing instruments can be used to write letters, figures, patterns, and the like on paper, synthetic paper, plastic films, cloth, metal plates and wood plates. Such letters, figures and patterns form a variety of colors when the temperature is changed. Therefore, the thermochromatic writing materials can be used in applications where pleasure, amusement or magic effects caused by the change of color are valued. Also, they can be used as temperature-indicating writing instruments.

In preparing writing inks for use in the above described writing instruments, the amount of the thermochromic material added can be changed within wide ranges and it varies depending on the type of the ink vehicle and the use of the writing instrument. Usually, the amount of the thermochromic material added is sufficient if it is from about 1% by weight to about 50% by weight based on the total weight of the writing ink, within which range the desired thermochromic properties are excellently obtained.

(3) Thermochromic Paints

Thermochromic paints can be prepared by dissolving or dispersing the thermochromic material or microencapsulated thermochromic material of the invention in a paint vehicle. These thermochromic paints can be coated on paper, a synthetic paper, a plastic film or plate, cloth, metal, porcelain, glass, wood and so forth. The thus coated surface forms a variety of colors upon changing the temperature thereof. Therefore, the thermochromic paints can be used in application where pleasure, amusement or magic effects caused by the change of color are valued. Also, they can be used as temperature-indicating writing materials.

As described above, the thermochromic material or microencapsulated thermochromic material of the invention is dissolved or dispersed in a vehicle comprising a natural resin, a modified natural resin, a synthetic resin, a solvent, and the like to prepare the thermochromic paint.

The amount of the thermochromic material used for the preparation of the thermochromic paint can be changed within wide ranges and it varies depending on the type of the vehicle and the use of the paint. Usually, the amount of the thermochromic material used is from about 1% by weight to about 50% by weight based on the total weight of the paint, with the range of about 5 to 40% by weight being preferred.

Conventional additives which are usually employed to improve conventional paints can be added to the thermochromic paint. Typical examples of such additives include plasticizers, drying accelerators, tackifiers, ultraviolet light absorbers, and flattening agents.

As described above, the thermochromic paint is prepared by appropriately selecting the vehicle depending on the type of the thermochromic material and the use of the thermochromic paint. The thus prepared thermochromatic paint can be coated by conventional coating techniques, such as brush coating, cold spray coating, hot spray coating, dip coating, flow coating, roller coating, and curtain flow coating, to produce the desired coated article.

(4) Thermochromic Sheets

Thermochromic sheets can be prepared by laminating a thermochromic layer containing the thermochromic material or microencapsulated thermochromic material of the invention on a backing material, and, if desired, by providing a protective layer on the thermochromic layer. Such thermochromic sheets can be used as ordinary household materials or industrial materials with or without additional processing.

In order to produce the above laminate structure comprising the thermochromic layer containing the thermochromic material of the invention, the backing material, and the protective layer, it is necessary to adhere the thermochromic material on the backing material by a suitable technique.

Lamination can be performed by, for example, a method in which the thermochromic material or microencapsulated thermochromic material of the invention is added to a polymeric substance, the resulting mixture is formed into a film, a filament or the like, and the film, filament or the like is then heat-pressed onto the backing material, or is laminated on the backing material using a suitable binder, e.g., a natural resin, a synthetic resin, and a wax. Alternatively, a paint containing therein the thermochromic material or microencapsulated thermochromic material of the invention can be coated on the backing material to produce the laminate. In addition, lining techniques such as flow dipping can be utilized.

The thermochromic layer can also be prepared by dissolving or dispersing the thermochromic material or microencapsulated thermochromic material in a printing ink vehicle to prepare a printing ink and printing or coating the thus prepared printing ink by suitable techniques such as letterpress printing, intaglio printing, lithographic printing, screen printing and the like.

The backing material is made of a material such as paper, cloth, various plastics, wood, glass, porcelain, stone, metal or composites thereof, and it acts as a support for the thermochromic layer and the protective layer.

The backing material can be provided with decorations such as patterns, pictures and photographs, and marks such as figures and letters. Furthermore, depending on the purpose for which the thermochromic sheet is used, an adhesive layer may be provided on the backing material or a metal plating, metal deposition or the like may be applied onto the backing material.

The protective layer is typically a film made of paraffin wax, microcrystalline wax, polyethylene, polypropylene, polystyrene, a styrene-butadiene copolymer, a polyester, polyvinyl chloride, polyvinyl acetate, polyvinyl butyral, polyacrylate, polyvinyl ether, polyvinyl alcohol, nitrocellulose, ethyl cellulose, hydroxypropyl cellulose, acetyl cellulose, starch or casein, which may be transparent, translucent, opaque or colored, depending on the use thereof. The protective layer can be heat bonded directly or after being printed or coated with a printing ink, a paint or the like in a conventional fashion. Additionally, the protective layer may be provided with irregularities to yield a source of visual amusement. Addition of additives such as ultraviolet light absorbers, antioxdants, visible light absorbers, anti-aging agents, singlet oxygen quenchers and super oxide anion quenchers to the protective layer permits not only physical protection of the thermochromic layer but also stabilization of weather resistance, etc., of the thermochromic layer. Additionally, as in the case of the backing material, the protective layer may be provided with decorations such as patterns, pictures and photographs, and marks such as figures and letters.

The thermochromic sheet comprising the thermochromic layer and backing material which are bonded together with a suitable binder, and if desired, the protective layer which is provided on the surface of the thermochromic layer, exhibits a sharp and reversible metachromatism at any temperature between $-100°$ C. and $+200°$ C. Therefore, when used in combination with non-thermochromic materials, the thermochromic sheet can be used as a commercially useful material having characteristics such as indication of temperature and information concerning temperature, ornamentation, curiosity, and shielding of light.

(5) Thermochromic Wrapping Materials

Thermochromic wrapping materials are prepared by retaining the thermochromic material or a combination of the thermochromic material and additives as described above together with a suitable catalyst in a wrapping material having at least one partial transparent area.

In addition, the thermochromic wrapping material can be prepared by holding a medium in a wrapping material containing therein the thermochromic material or a combination of the thermochromic material and other material as described above. Such a thermochromic wrapping material indicates the temperature of the medium contained therein without deterioration of the thermochromic properties of the thermochromic material, forms various colors according to changes in temperature, and transmits or shields light. Utilizing such characteristics, it is useful in various applications.

The invention will now be described in detail with reference to the following examples although it is not limited thereto.

In Examples 1 to 105, thermochromic materials comprising components (a), (b), (c) and (d) were used. These thermochromic materials were prepared by mixing components (a), (b), (c) and (d), uniformly melting the mixture by heating at about $80°$ to $100°$ C., and cooling the resulting molten mixture to room temperature. Thermochromatic properties and light-fastness were then tested.

For comparison, thermochromic materials not containing component (d) were prepared and tested in the same manner as above (Comparative Examples 1 to 12).

In Examples 106 to 158, thermochromic materials comprising components (a), (b), (c), (d) and (e) were used. These thermochromic materials were prepared by mixing components (a), (b), (c), (d) and (e), uniformly melting the mixture by heating at about $80°$ to $100°$ C., and cooling the resulting molten mixture to room temperature. Thermochromic properties and light-fastness were then tested.

The compositions and the characteristics of the thermochromic materials are shown in Table 1.

Terms and symbols used in Table 1 are as follows:

Temperature of Coloration/Decoloration and Color

| Color below the temperature of coloration/ decoloration | Temperature of coloration/de-coloration (°C.) | Color above the temperature of coloration/ decoloration |
|---|---|---|

The mark ($\rightleftarrows$) indicates that the coloration/decoloration is reversible.

Figures in the Parentheses

Amount of component (g)

Light-Fastness (Order of Light-Fastness)

Magnification indicates the light-fastness of the thermochromic materials comprising components (a), (b), (c) and (d) or (d) and (e) taking the light-fastness of a thermochromic material comprising components (a), (b) and (c) as 1. Light-fastness was determined by measuring the time until the color of the test piece clearly changed by exposing it to sun light.

The magnification varies slightly depending on the type of irradiation, e.g., a carbon arc lamp, direct sun, light place facing south in a room or facing north in a room.

Component (a)

Electron-donating, chromatic organic compound

Component (b)

One or more phenolic hydroxy group-containing compounds and derivatives thereof and carboxyl group-containing compounds and derivatives thereof Component (c)

One or more alcohols, esters, ketones, ethers, acid amides and carboxylic acids

Component (d)

One or more N-radical, P-radical, O-radical and S-radical cationic compounds having an aromatic ring or rings.

Component (e)

One or more photo-stabilizers.

| Symbols | |
|---|---|
| CVL | Crystal Violet Lactone |
| PSD-V | 3-Diethylamino-6-methyl-7-chlorofluoran |
| PSD-P | 3-Diethylamino-7,8-benzofluoran |
| IR | 3,3-Bis(1-ethyl-2-methyl-1H—indol-3-yl)-1(3H)—isobenzofuranone, |
| WX | 4,4'-Thio-bis(6-tert-butyl-3-methylphenol) |
| bis-Phenol S | 4,4'-Dioxy diphenyl sulfone |
| PSD-150 | 6'-(Cyclohexylmethylamino)-3'-methyl-2'-(phenylamino)-spiro[isobenzofuran-1(3H), 9'(9H)xanthen]-3-one, |

-continued

| Symbols | |
|---|---|
| #1014 | 3'-(Diethylamino)-6',8'-dimethyl-spiro[isobenzofuran-1(3H), 9'(9H)xanthen]-3-one, |
| #1017 | 4,5,6,7-Tetrachloro-3,3-bis[4-(dimethylamino)-phenyl]-1(3H)—isobenzofuranone, |
| Y-1 | 3',6'-Dimethoxy-spiro[isobenzofuran-1(3H), 9'-(9H)xanthen]-3-one, |
| PSD-R | 3-Diethylaminofluoran-ω-2-chlorophenylimido lactam |
| Phenol resin PP-810 | Phenylphenol-formaldehyde resin having a melting point of 75 to 90° C. |
| Zu-P | Di-β-naphthospiropyran |
| UV-326 | 2-(2'-Hydroxy-3'-tert-butyl-5'-methylphenyl)-5-chlorobenzotriazole |
| UV-P | 2-(2-Hydroxy-5'-methyl-phenyl)benzotriazole |
| UV-103 | 2-Hydroxy-4-dodecyl oxybenzophenone |
| UV N-35 | Ethyl-2-cyano-3,3-diphenyl acrylate |
| Q-2002 | Ni—3,3-di-tert-butyl-4-hydroxy benzyl-o-ethyl phosphate |
| Q-NBC | Ni—Dibutyl thiocarbamate |
| Yellow Dye | C.I. Solvent Yellow 60 |
| Blue Dye | C.I. Solvent Blue 55 |
| Black Dye | C.I. Solvent Black 22 |
| Red Dye | C.I. Solvent Red 83 |

TABLE 1

| Ex. No. | Thermochromic Material | | | | | Thermochromic Properties | |
|---|---|---|---|---|---|---|---|
| | Component (a) (g) | Component (b) (g) | Component (c) (g) | Component (d) (g) | Component (e) (g) | Temperature of Coloration/De-coloration (°C.) | Light Fastness (magnification) |
| Comparative Ex. 1 | CVL (1) | bisphenol-A (2) | n-stearyl alcohol (50) | — | — | blue ⇌ 53 ⇌ colorless | 1 |
| Ex. 1 | " | " | n-stearyl alcohol (50) | tris(p-diethylaminophenyl) aminium hexafluoroantimonate (0.1) | — | blue ⇌ 53 ⇌ light green | 4–5 |
| Ex. 2 | " | " | n-stearyl alcohol (50) | tris(p-diethylaminophenyl) aminium hexafluoroantimonate (0.3) | — | blue ⇌ 53 ⇌ light green | 10–15 |
| Ex. 3 | " | " | n-stearyl alcohol (50) | tris(p-di-n-butylaminophenyl) aminium hexafluoroarsenate (0.3) | — | blue ⇌ 53 ⇌ light green | 10–15 |
| Ex. 4 | " | " | n-stearyl alcohol (50) | bis(p-diethylaminophenyl) ethylaminium hexafluoro-antimonate (0.2) | — | blue ⇌ 53 ⇌ light green | 6–8 |
| Ex. 5 | " | " | n-stearyl alcohol (50) | p-diethylaminophenyldiethyl-aminium hexafluoroantimonate (0.2) | — | blue ⇌ 53 ⇌ light green | 3–4 |
| Ex. 6 | " | " | n-stearyl alcohol (50) | bis(p-di-n-butylaminophenyl) [N,N—bis-(p-di-n-butylamino-phenyl)-p-aminophenyl]aminium hexafluoroantimonate (0.1) | — | blue ⇌ 53 ⇌ light green | 4–5 |
| Ex. 7 | " | " | n-stearyl alcohol (50) | bis(p-di-n-butylaminophenyl) [N,N—bis-(p-di-n-butylamino-phenyl)-p-aminophenyl]aminium hexafluoroantimonate (0.3) | — | blue ⇌ 53 ⇌ light green | 10–15 |
| Ex. 8 | " | " | n-stearyl alcohol (50) | bis(p-di-n-butylaminophenyl) [N,N—bis-(p-di-n-butylamino-phenyl)-p-aminophenyl]aminium hexafluoroantimonate (0.6) | — | blue ⇌ 53 ⇌ light green | 20–25 |
| Ex. 9 | " | " | n-stearyl alcohol (50) | bis(p-di-n-octylaminophenyl) [N,N—bis-(p-di-n-octylamino-phenyl)-p-aminophenyl]aminium fluoroborate (0.3) | — | blue ⇌ 53 ⇌ light green | 10–15 |
| Ex. 10 | " | " | n-stearyl alcohol (50) | pentaphenylpyronium fluoroborate (0.2) | — | blue ⇌ 53 ⇌ light green | 5–6 |

TABLE 1-continued

| Ex. No. | Thermochromic Material | | | | | Thermochromic Properties | |
|---|---|---|---|---|---|---|---|
| | Component (a) (g) | Component (b) (g) | Component (c) (g) | Component (d) (g) | Component (e) (g) | Temperature of Coloration/Decoloration (°C.) | Light Fastness (magnification) |
| Ex. 11 | " | " | n-stearyl alcohol (50) | tetrakis(p-tolyl)hydrazinium hexachloroantimonate (0.3) | — | blue ⇌ 52 light purple | 5–6 |
| Ex. 12 | " | " | n-stearyl alcohol (50) | N,N,N',N'—tetrakis(p-di-n-butylaminophenyl)-p-benzo-quinone-bis(imonium hexafluoroantimonate) (0.1) | — | blue ⇌ 53 light green | 4–5 |
| Ex. 13 | " | " | n-stearyl alcohol (50) | N,N,N',N'—tetrakis(p-di-n-butylaminophenyl)-p-benzo-quinone-bis(imonium hexafluoroantimonate) (0.3) | — | blue ⇌ 53 light green | 10–15 |
| Ex. 14 | " | " | n-stearyl alcohol (50) | N,N—bis(p-diethylaminophenyl)-N',N'—diethyl-p-benzoquinone-bis(imonium hexafluoroarsenate) (0.3) | — | blue ⇌ 53 light green | 8–10 |
| Ex. 15 | " | " | n-stearyl alcohol (50) | N-p-tolyl-2,7-dimethylpheno-thiazinium fluoroborate (0.2) | — | blue ⇌ 52 light blue | 4–5 |
| Ex. 16 | " | " | n-stearyl alcohol (50) | tris(p-diethylaminophenyl) phosphinium hexafluoroanti-monate (0.3) | — | blue ⇌ 53 light green | 8–12 |
| Ex. 17 | " | " | n-stearyl alcohol (50) | 2,7-dimethyldibenzo-p-dioxinium hexafluoroarsenate (0.2) | — | blue ⇌ 52 light blue | 4–5 |
| Ex. 18 | " | " | n-stearyl alcohol (50) | 2-methyl-7-chlorothianthrene cation fluoroborate (0.2) | — | blue ⇌ 52 light grey | 4–5 |
| Comparative Ex. 2 | PSD-V (1) | bisphenol-A zinc salt (2) | cetyl alcohol (15) lauryl stearate (10) | — | — | vermillion ⇌ 33 colorless | 1 |
| Ex. 19 | " | bisphenol-A zinc salt (2) | cetyl alcohol (15) lauryl stearate (10) | tris(p-diethylaminophenyl) aminium hexafluoroantimonate (0.3) | — | vermillion ⇌ 33 light green | 10–15 |

TABLE 1-continued

| | Thermochromic Material | | | | | Thermochromic Properties | |
|---|---|---|---|---|---|---|---|
| Ex. No. | Component (a) (g) | Component (b) (g) | Component (c) (g) | Component (d) (g) | Component (e) (g) | Temperature of Coloration/De-coloration (°C.) | Light Fastness (magnification) |
| Ex. 20 | " | bisphenol-A zinc salt (2) | cetyl alcohol (15) lauryl stearate (10) | tris(p-diethylaminophenyl) aminium hexafluoroantimonate (0.6) | — | vermillion ⇌ 33 light green | 20-25 |
| Ex. 21 | " | bisphenol-A zinc salt (2) | cetyl alcohol (15) lauryl stearate (10) | tris(p-di-n-octylaminophenyl) aminium perchlorate (0.3) | — | vermillion ⇌ 33 light green | 10-15 |
| Ex. 22 | " | bisphenol-A zinc salt (2) | cetyl alcohol (15) lauryl stearate (10) | bis(p-di-n-butylaminophenyl) [N,N—bis(p-di-n-butylamino-phenyl)-p-aminophenyl]aminium hexafluoroarsenate (0.1) | — | vermillion ⇌ 33 light green | 4-5 |
| Ex. 23 | " | bisphenol-A zinc salt (2) | cetyl alcohol (15) lauryl stearate (10) | bis(p-di-n-butylaminophenyl) [N,N—bis(p-di-n-butylamino-phenyl)-p-aminophenyl]aminium hexafluoroarsenate (0.3) | — | vermillion ⇌ 33 light green | 10-15 |
| Ex. 24 | " | bisphenol-A zinc salt (2) | cetyl alcohol (15) lauryl stearate (10) | bis(p-di-n-butylaminophenyl) [N,N—bis(p-di-n-butylamino-phenyl)-p-aminophenyl]aminium hexafluoroarsenate (0.6) | — | vermillion ⇌ 33 light green | 20-25 |
| Ex. 25 | " | bisphenol-A zinc salt (2) | cetyl alcohol (15) lauryl stearate (10) | N,N,N',N'—tetrakis(p-di-n-butylaminophenyl)-p-benzo-quinone-bis(imonium hexa-fluoroantimonate) (0.1) | — | vermillion ⇌ 33 light green | 4-5 |
| Ex. 26 | " | bisphenol-A zinc salt (2) | cetyl alcohol (15) lauryl stearate (10) | N,N,N',N'—tetrakis(p-di-n-butylaminophenyl)-p-benzo-quinone-bis(imonium hexa-fluoroantimonate) (0.6) | — | vermillion ⇌ 33 light green | 20-25 |
| Ex. 27 | " | bisphenol-A zinc salt (2) | cetyl alcohol (15) lauryl stearate (10) | N,N,N',N'—tetrakis(p-di-n-butylaminophenyl)-p-dipheno-quinone-bis(imonium fluoroborate) (0.3) | — | vermillion ⇌ 33 light green | 10-15 |
| Ex. 28 | " | bisphenol-A zinc salt (2) | cetyl alcohol (15) lauryl stearate (10) | N,N,N',N'—tetrakis(p-di-n-butylaminophenyl)-p-dipheno-quinone-bis(imonium fluoroborate) (0.6) | — | vermillion ⇌ 33 light green | 20-25 |

TABLE 1-continued

| | Thermochromic Material | | | | | Thermochromic Properties | |
|---|---|---|---|---|---|---|---|
| Ex. No. | Component (a) (g) | Component (b) (g) | Component (c) (g) | Component (d) (g) | Component (e) (g) | Temperature of Coloration/Decoloration (°C) | Light Fastness (magnification) |
| Ex. 29 | " | bisphenol-A zinc salt (2) | cetyl alcohol (15) lauryl stearate (10) | bis(p-di-n-laurylaminophenyl)[N,N—bis(p-di-n-laurylaminophenyl)-p-aminophenyl]aminium perchlorate (0.4) | — | vermillion ⇌ 33 light green | 10–15 |
| Ex. 30 | " | bisphenol-A zinc salt (2) | cetyl alcohol (15) lauryl stearate (10) | N—phenylphenothiazinium trifluoroacetate (0.2) | — | vermillion ⇌ 33 light blue | 5–6 |
| Ex. 31 | " | bisphenol-A zinc salt (2) | cetyl alcohol (15) lauryl stearate (10) | tris(p-di-n-butylaminophenyl) phosphinium hexafluoroantimonate (0.3) | — | vermillion ⇌ 33 light green | 8–12 |
| Comparative Ex. 3 | PSD-P (1) | zinc benzoate (2) | myristic alcohol (15) stearyl caprate (10) | — | — | pink ⇌ 25 colorless | 1 |
| Ex. 32 | " | " | myristic alcohol (15) stearyl caprate (10) | pentaphenylpyrrolinium perchlorate (0.2) | — | pink ⇌ 25 light gray | 4–5 |
| Ex. 33 | " | " | myristic alcohol (15) stearyl caprate (10) | tris(p-diethylaminophenyl) aminium hexafluoroantimonate (0.1) bis(p-di-n-butylaminophenyl)-[N,N—bis(p-di-n-butylaminophenyl)-p-aminophenyl]aminium hexafluoroantimonate (0.2) | — | pink ⇌ 25 light green | 10–15 |
| Ex. 34 | " | " | myristic alcohol (15) stearyl caprate (10) | tris(p-diethylaminophenyl) aminium hexafluoroantimonate (0.3) bis(p-di-n-butylaminophenyl)-[N,N—bis(p-di-n-butylaminophenyl)-p-aminophenyl]aminium hexafluoroantimonate (0.3) | — | pink ⇌ 25 light green | 20–25 |

TABLE 1-continued

| Ex. No. | Thermochromic Material | | | | | Thermochromic Properties | |
|---|---|---|---|---|---|---|---|
| | Component (a) (g) | Component (b) (g) | Component (c) (g) | Component (d) (g) | Component (e) (g) | Temperature of Coloration/Decoloration (°C.) | Light Fastness (magnification) |
| Ex. 35 | " | " | myristic alcohol (15) stearyl caprate (10) | N,N,N',N'—tetrakis(p-diethyl-aminophenyl)-p-diphenoquinone-bis(imonium hexafluoroarsenate) (0.3) | — | pink ⇌25⇌ light green | 10-15 |
| Ex. 36 | " | " | myristic alcohol (15) stearyl caprate (10) | N,N,N',N'—tetrakis(p-diethyl-aminophenyl)-p-diphenoquinone-bis(imonium hexafluoroarsenate) (0.6) | — | pink ⇌25⇌ light green | 20-25 |
| Ex. 37 | " | " | myristic alcohol (15) stearyl caprate (10) | 2,7-dichlorothianthrene cation fluoroborate (0.2) | — | pink ⇌25⇌ light grey | 3-4 |
| Ex. 38 | " | " | myristic alcohol (15) stearyl caprate (10) | 1,2,4,5-tetrakis(ethylthio) benzene cation hexachloro-antimonate (0.2) | — | pink ⇌25⇌ light grey | 3-4 |
| Ex. 39 | " | " | myristic alcohol (15) stearyl caprate (10) | 2-methyl-7-chlorodibenzo-p-dioxinium picrate (0.2) | — | pink ⇌25⇌ light blue | 3-4 |
| Comparative Ex. 4 | IR (1) | WX (3) | stearyl stearate (25) | — | — | pink ⇌48⇌ colorless | 1 |
| Ex. 40 | " | " | stearyl stearate (25) | tris(p-di-n-butylaminophenyl) aminium fluoroborate (0.1) | — | pink ⇌48⇌ light green | 3-4 |
| Ex. 41 | " | " | stearyl stearate (25) | tris(p-di-n-butylaminophenyl) aminium fluoroborate (0.3) | — | pink ⇌48⇌ light green | 10-12 |
| Ex. 42 | " | " | stearyl stearate (25) | tris(p-di-n-butylaminophenyl) aminium fluoroborate (0.6) | — | pink ⇌48⇌ light green | 20-25 |
| Ex. 43 | " | " | stearyl stearate (25) | N,N,N',N'—tetrakis(p-diethyl-aminophenyl)-p-diphenoquinone-bis(imonium hexafluoro-arsenate) (0.3) | — | pink ⇌48⇌ light green | 10-15 |

TABLE 1-continued

| | Thermochromic Material | | | | | Thermochromic Properties | |
|---|---|---|---|---|---|---|---|
| Ex. No. | Component (a) (g) | Component (b) (g) | Component (c) (g) | Component (d) (g) | Component (e) (g) | Temperature of Coloration/Decoloration (°C.) | Light Fastness (magnification) |
| Ex. 44 | " | " | stearyl stearate (25) | N,N,N',N'—tetrakis(p-diethylaminophenyl)-p-diphenoquinone-bis(imonium hexafluoroarsenate) (0.6) | — | pink ⇌ 48 light green | 20-25 |
| Ex. 45 | " | " | stearyl stearate (25) | tetrakis(p-dimethylaminophenyl) hydrazinium hexafluoroantimonate (0.3) | — | pink ⇌ 48 light purple | 6-9 |
| Ex. 46 | " | " | stearyl stearate (25) | tris(p-di-n-octylaminophenyl) phosphinium hexafluoroarsenate (0.3) | — | pink ⇌ 48 light green | 8-12 |
| Ex. 47 | " | " | stearyl stearate (25) | dibenzo-p-dioxinium perchlorate (0.2) | — | pink ⇌ 48 light blue | 3-4 |
| Ex. 48 | " | " | stearyl stearate (25) | bis(4-n-butylphenyl)sulfide cation hexafluoroarsenate (0.2) | — | pink ⇌ 48 light grey | 3-4 |
| Comparative Ex. 5 | PSD-150 (1) | bisphenol S (1) p-chlorobenzoic acid (1) | distearyl ketone (25) | — | — | black ⇌ 88 colorless | 1 |
| Ex. 49 | " | bisphenol S (1) p-chlorobenzoic acid (1) | distearyl ketone (25) | tris(p-di-n-butylaminophenyl) aminium hexafluoroantimonate (0.3) | — | black ⇌ 88 light green | 10-15 |
| Ex. 50 | " | bisphenol S (1) p-chlorobenzoic acid (1) | distearyl ketone (25) | tris(p-di-n-butylaminophenyl) aminium hexafluoroantimonate (0.6) | — | black ⇌ 88 light green | 20-25 |
| Ex. 51 | " | bisphenol S (1) p-chlorobenzoic acid (1) | distearyl ketone (25) | pentaphenylpyrrolinium fluoroborate (0.3) | — | black ⇌ 88 light green | 5-6 |

TABLE 1-continued

| Ex. No. | Component (a) (g) | Component (b) (g) | Component (c) (g) | Component (d) (g) | Component (e) (g) | Temperature of Coloration/Decoloration (°C.) | Light Fastness (magnification) |
|---|---|---|---|---|---|---|---|
| Ex. 52 | " | bisphenol S (1) p-chlorobenzoic acid (1) | distearyl ketone (25) | bis(p-diethylaminophenyl) ethylphosphinium picrate (0.3) | — | black ⇌88⇌ light green | 8-10 |
| Ex. 53 | " | bisphenol S (1) p-chlorobenzoic acid (1) | distearyl ketone (25) | 2,4,6-triphenylphenoxinium perchlorate (0.3) | — | black ⇌88⇌ light blue | 4-5 |
| Ex. 54 | " | bisphenol S (1) p-chlorobenzoic acid (1) | distearyl ketone (25) | 2-methyldibenzo-p-dioxinium fluoroborate (0.3) | — | black ⇌88⇌ light blue | 4-5 |
| Ex. 55 | " | bisphenol S (1) p-chlorobenzoic acid (1) | distearyl ketone (25) | 2,3,5,6-tetramethyl-1,4-dithiin cation trichloroacetate (0.2) | — | black ⇌88⇌ light grey | 3-4 |
| Ex. 56 | " | bisphenol S (1) p-chlorobenzoic acid (1) | distearyl ketone (25) | 2-ethyl-7-chlorophenoxanthiin cation hexafluoroarsenate (0.2) | — | black ⇌88⇌ light grey | 3-4 |
| Comparative Ex. 6 | #1014 (1) | propyl gallate (2) | oleyl alcohol (20) phenyl benzoate (5) | — | — | orange ⇌−10⇌ colorless | 1 |
| Ex. 57 | " | propyl gallate (2) | oleyl alcohol (20) phenyl benzoate (5) | bis(p-diethylaminophenyl) ethylaminium hexafluoroantimonate (0.3) | — | orange ⇌−10⇌ light green | 4-5 |

TABLE 1-continued

| | Thermochromic Material | | | | Thermochromic Properties | |
|---|---|---|---|---|---|---|
| Ex. No. | Component (a) (g) | Component (b) (g) | Component (c) (g) | Component (d) (g) | Component (e) (g) | Temperature of Coloration/De-coloration (°C.) | Light Fastness (magnification) |
| Ex. 58 | " | propyl gallate (2) | oleyl alcohol (20) phenyl benzoate (5) | bis(p-diethylaminophenyl) ethylaminium hexafluoro-antimonate (0.6) | — | orange $\underset{-10}{\rightleftarrows}$ light green | 8-10 |
| Ex. 59 | " | propyl gallate (2) | oleyl alcohol (20) phenyl benzoate (5) | N,N,N',N'—tetrakis(p-diethyl aminophenyl)-p-diphenoquinone-bis(imonium hexafluoro-arsenate) (0.3) | — | orange $\underset{-10}{\rightleftarrows}$ light green | 6-8 |
| Ex. 60 | " | propyl gallate (2) | oleyl alcohol (20) phenyl benzoate (5) | N,N,N',N'—tetrakis(p-diethyl aminophenyl)-p-diphenoquinone-bis(imonium hexafluoro-arsenate) (0.6) | — | orange $\underset{-10}{\rightleftarrows}$ light green | 12-15 |
| Ex. 61 | " | propyl gallate (2) | oleyl alcohol (20) phenyl benzoate (5) | bis(p-di-n-butylaminophenyl)-n-butylphosphinium hexachloro antimonate (0.3) | — | orange $\underset{-10}{\rightleftarrows}$ light green | 4-5 |
| Ex. 62 | " | propyl gallate (2) | oleyl alcohol (20) phenyl benzoate (5) | bis(4-methylphenyl)sulfide cation benzenesulfonate (0.3) | — | orange $\underset{-11}{\rightleftarrows}$ light grey | 3-4 |
| Ex. 63 | " | propyl gallate (2) | oleyl alcohol (20) phenyl benzoate (5) | 1,2,4,5-tetrakis(ethylthio) benzene cation fluoroborate (0.2) | — | orange $\underset{-10}{\rightleftarrows}$ light grey | 2-3 |
| Ex. 64 | " | propyl gallate (2) | oleyl alcohol (20) phenyl benzoate (5) | 6,7-diethyl-1,4-benzodithiin cation picrate (0.2) | — | orange $\underset{-10}{\rightleftarrows}$ light grey | 2-3 |

TABLE 1-continued

| Ex. No. | Thermochromic Material | | | | Thermochromic Properties | |
|---|---|---|---|---|---|---|
| | Component (a) (g) | Component (b) (g) | Component (c) (g) | Component (d) (g) | Component (e) (g) | Temperature of Coloration/De-coloration (°C.) | Light Fastness (magnification) |
| Comparative Ex. 7 | 3-(4-n-butyl-amino-phenyl)-3-(1,2-di-methyl-indol-3-yl) phthalide (1) | copper 2-hydroxy-3-naphthonate (2) | stearic acid (20) docosyl alcohol (20) | — | — | purple ⇌70⇌ colorless | 1 |
| Ex. 65 | 3-(4-n-butyl-amino-phenyl)-3-(1,2-di-methyl-indol-3-yl) phthalide (1) | copper 2-hydroxy-3-naphthonate (2) | stearic acid (20) docosyl alcohol (20) | bis(p-diisopropylaminophenyl) [N,N—bis-(p-di-isopropylamino-phenyl)-p-aminophenyl]aminium hexafluoroarsenate (0.3) | — | purple ⇌70⇌ light green | 10-15 |
| Ex. 66 | 3-(4-n-butyl-amino-phenyl)-3-(1,2-di-methyl-indol-3-yl) phthalide (1) | copper 2-hydroxy-3-naphthonate (2) | stearic acid (20) docosyl alcohol (20) | bis(p-diisopropylaminophenyl) [N,N—bis-(p-di-isopropylamino-phenyl)-p-aminophenyl]aminium hexafluoroarsenate (0.6) | — | purple ⇌70⇌ light green | 20-25 |
| Ex. 67 | 3-(4-n-butyl-amino-phenyl)-3-(1,2-di-methyl-indol-3-yl) phthalide (1) | copper 2-hydroxy-3-naphthonate (2) | stearic acid (20) docosyl alcohol (20) | tris(p-diethylaminophenyl) aminium perchlorate (0.3) | — | purple ⇌70⇌ light green | 10-15 |

TABLE 1-continued

| Ex. No. | Thermochromic Material | | | | | Thermochromic Properties | |
|---|---|---|---|---|---|---|---|
| | Component (a) (g) | Component (b) (g) | Component (c) (g) | Component (d) (g) | Component (e) (g) | Temperature of Coloration/Decoloration (°C.) | Light Fastness (magnification) |
| Ex. 68 | 3-(4-n-butylaminophenyl)-3-(1,2-dimethylindol-3-yl)phthalide (1) | copper 2-hydroxy-3-naphthonate (2) | stearic acid (20) docosyl alcohol (20) | tris(p-diethylaminophenyl)aminium perchlorate (0.6) | — | purple ⇌70 light green | 20–25 |
| Ex. 69 | 3-(4-n-butylaminophenyl)-3-(1,2-dimethylindol-3-yl)phthalide (1) | copper 2-hydroxy-3-naphthonate (2) | stearic acid (20) docosyl alcohol (20) | N,N—bis(p-diethylaminophenyl)-N',N'—diethyl-p-benzoquinone-bis-(imonium trifluoroacetate) (0.3) | — | purple ⇌70 light green | 8–10 |
| Ex. 70 | 3-(4-n-butylaminophenyl)-3-(1,2-dimethylindol-3-yl)phthalide (1) | copper 2-hydroxy-3-naphthonate (2) | stearic acid (20) docosyl alcohol (20) | N,N,N',N'—tetrakis(p-diethylaminophenyl)-p-diphenoquinone-bis(imonium hexafluoroarsenate) (0.6) | — | purple ⇌70 light green | 20–25 |
| Ex. 71 | 3-(4-n-butylaminophenyl)-3-(1,2-dimethylindol-3-yl)phthalide (1) | copper 2-hydroxy-3-naphthonate (2) | stearic acid (20) docosyl alcohol (20) | N—phenyl-2-methyl-7-chloro phenothiazinium fluoroborate (0.3) | — | purple ⇌70 light blue | 6–7 |

TABLE 1-continued

| Ex. No. | Thermochromic Material | | | | | Thermochromic Properties | |
|---|---|---|---|---|---|---|---|
| | Component (a) | Component (b) | Component (c) | Component (d) | Component (e) | Temperature of Coloration/De-coloration (°C.) | Light Fastness (magnification) |
| Ex. 72 | 3-(4-n-butyl-amino-phenyl)-3-(1,2-di-methyl-indol-3-yl) phthalide (1) | copper 2-hydroxy-3-naphthonate (2) | stearic acid (20) docosyl alcohol (20) | bis(p-di-n-butylaminophenyl) n-butylphosphinium picrate (0.3) | — | purple ⇌ 70 ⇌ light green | 6–8 |
| Ex. 73 | 3-(4-n-butyl-amino-phenyl)-3-(1,2-di-methyl-indol-3-yl) phthalide (1) | copper 2-hydroxy-3-naphthonate (2) | stearic acid (20) docosyl alcohol (20) | 2-methylbenzo-p-dioxinium picrate (0.2) | — | purple ⇌ 70 ⇌ light blue | 3–4 |
| Ex. 74 | 3-(4-n-butyl-amino-phenyl)-3-(1,2-di-methyl-indol-3-yl) phthalide (1) | copper 2-hydroxy-3-naphthonate (2) | stearic acid (20) docosyl alcohol (20) | 2-methylbenzo-p-dioxinium picrate (0.4) | — | purple ⇌ 70 ⇌ light blue | 6–8 |
| Ex. 75 | 3-(4-n-butyl-amino-phenyl)-3-(1,2-di-methyl-indol-3-yl) phthalide (1) | copper 2-hydroxy-3-naphthonate (2) | stearic acid (20) docosyl alcohol (20) | 2,5-dimethyl-1,4-dithiin cation ethylsulfonate (0.2) | — | purple ⇌ 70 ⇌ light grey | 2–3 |

TABLE 1-continued

| Ex. No. | Thermochromic Material | | | | | Thermochromic Properties | |
|---|---|---|---|---|---|---|---|
| | Component (a) (g) | Component (b) (g) | Component (c) (g) | Component (d) (g) | Component (e) (g) | Temperature of Coloration/De-coloration (°C.) | Light Fastness (magnification) |
| Ex. 76 | 3-(4-n-butyl-amino-phenyl)-3-(1,2-di-methyl-indol-3-yl)phthalide (1) | copper 2-hydroxy-3-naphthonate (2) | stearic acid (20) docosyl alcohol (20) | 2,7-dimethylphenoxanthiin cation trifluoroacetate (0.2) | — | purple $\underset{\rightleftarrows}{70}$ light grey | 2-3 |
| Ex. 77 | 3-(4-n-butyl-amino-phenyl)-3-(1,2-di-methyl-indol-3-yl)phthalide (1) | copper 2-hydroxy-3-naphthonate (2) | stearic acid (20) docosyl alcohol (20) | bis(4-ethylphenyl)sulfide cation sulfate (0.2) | — | purple $\underset{\rightleftarrows}{70}$ light grey | 1.5-2 |
| Comparative Ex. 8 | #1017 (1) | octyl p-oxybenzoate (2) | diphenyl ether (25) | — | — | green $\underset{\rightleftarrows}{5}$ colorless | 1 |
| Ex. 78 | " | octyl p-oxybenzoate (2) | diphenyl ether (25) | bis(p-di-n-butylaminophenyl)[N,N—bis(p-di-n-butylamino-phenyl)-p-aminophenyl]aminium hexafluoroantimonate (0.3) | — | green $\underset{\rightleftarrows}{5}$ light green | 8-12 |
| Ex. 79 | " | octyl p-oxybenzoate (2) | diphenyl ether (25) | bis(p-di-n-butylaminophenyl)[N,N—bis(p-di-n-butylamino-phenyl)-p-aminophenyl]aminium hexafluoroantimonate (0.6) | — | green $\underset{\rightleftarrows}{5}$ light green | 15-20 |
| Ex. 80 | " | octyl p-oxybenzoate (2) | diphenyl ether (25) | pentaphenylpyrrolinium fluoroborate (0.2) | — | green $\underset{\rightleftarrows}{5}$ light green | 4-5 |
| Ex. 81 | " | octyl p-oxybenzoate (2) | diphenyl ether (25) | pentaphenylpyrrolinium fluoroborate (0.4) | — | green $\underset{\rightleftarrows}{5}$ light green | 8-10 |
| Ex. 82 | " | octyl p-oxybenzoate (2) | diphenyl ether (25) | tetrakis(p-ethylphenyl)hydrazinium hexachloro-antimonate (0.2) | — | green $\underset{\rightleftarrows}{5}$ light purple | 4-5 |

TABLE 1-continued

| Ex. No. | Thermochromic Material | | | | | Thermochromic Properties | |
|---|---|---|---|---|---|---|---|
| | Component (a) (g) | Component (b) (g) | Component (c) (g) | Component (d) (g) | Component (e) (g) | Temperature of Coloration/De-coloration (°C.) | Light Fastness (magnification) |
| Ex. 83 | " | octyl p-oxybenzoate (2) | diphenyl ether (25) | 2,4,6-tris(4-methylphenyl) phenoxinium picrate (0.3) | — | green ⇌ 5 light blue | 3-4 |
| Ex. 84 | " | octyl p-oxybenzoate (2) | diphenyl ether (25) | 2,7-diethylthianthrene cation perchlorate (0.2) | — | green ⇌ 5 light grey | 2-3 |
| Ex. 85 | " | octyl p-oxybenzoate (2) | diphenyl ether (25) | phenoxanthiin cation trifluoroacetate (0.3) | — | green ⇌ 5 light grey | 3-4 |
| Comparative Ex. 9 | Y-1 (1.5) | octyl phenol (3) | 12-hydroxy-stearic acid triglyceride (30) | — | — | yellow ⇌ 65 colorless | 1 |
| Ex. 86 | " | " | 12-hydroxy-stearic acid triglyceride (30) | tris(p-di-n-butylaminophenyl) aminium hexafluoroarsenate (0.3) | — | yellow ⇌ 65 light green | 10-15 |
| Ex. 87 | " | " | 12-hydroxy-stearic acid triglyceride (30) | tris(p-di-n-butylaminophenyl) aminium hexafluoroarsenate (0.6) | — | yellow ⇌ 65 light green | 20-25 |
| Ex. 88 | " | " | 12-hydroxy-stearic acid triglyceride (30) | tetrakis(p-tolyl)hydrazinium bromide (0.2) | — | yellow ⇌ 65 light purple | 2 |
| Ex. 89 | " | " | 12-hydroxy-stearic acid triglyceride (30) | tris(p-diethylaminophenyl) phosphinium fluoroborate (0.3) | — | yellow ⇌ 65 light green | 8-10 |
| Ex. 90 | " | " | 12-hydroxy-stearic acid triglyceride (30) | N—phenyl-2,7-dimethyl-phenothiazinium hexafluoro-antimonate (0.3) | — | yellow ⇌ 65 light green | 6-8 |
| Ex. 91 | " | " | 12-hydroxy-stearic acid triglyceride (30) | 2,3,7,8-tetramethylphenoxanthiin cation perchlorate (0.2) | — | yellow ⇌ 65 light grey | 2-3 |

TABLE 1-continued

| Ex. No. | Thermochromic Material | | | | | Thermochromic Properties | |
|---|---|---|---|---|---|---|---|
| | Component (a) (g) | Component (b) (g) | Component (c) (g) | Component (d) (g) | Component (e) (g) | Temperature of Coloration/Decoloration (°C.) | Light Fastness (magnification) |
| Comparative Ex. 10 | PSD-R (1) | phenol resin PP-810 (2) | stearic acid amide (25) | — | — | red $\underset{\Longleftarrow}{\overset{95}{\Longrightarrow}}$ colorless | 1 |
| Ex. 92 | " | phenol resin PP-810 (2) | stearic acid amide (25) | tetrakis(p-ethylphenyl) hydrazinium hexafluoroantimonate (0.3) | — | red $\underset{\Longleftarrow}{\overset{95}{\Longrightarrow}}$ light purple | 6-8 |
| Ex. 93 | " | phenol resin PP-810 (2) | stearic acid amide (25) | pentaphenylpyrrolinium fluoroborate (0.2) | — | red $\underset{\Longleftarrow}{\overset{95}{\Longrightarrow}}$ light green | 2-3 |
| Ex. 94 | " | phenol resin PP-810 (2) | stearic acid amide (25) | pentaphenylpyrrolinium fluoroborate (0.4) | — | red $\underset{\Longleftarrow}{\overset{95}{\Longrightarrow}}$ light green | 5-6 |
| Ex. 95 | " | phenol resin PP-810 (2) | stearic acid amide (25) | N—phenyl-2-methylphenothiazinium hexachloroantimonate (0.3) | — | red $\underset{\Longleftarrow}{\overset{95}{\Longrightarrow}}$ light green | 4-5 |
| Ex. 96 | " | phenol resin PP-810 (2) | stearic acid amide (25) | tris(p-di-n-octylaminophenyl) phosphinium picrate (0.3) | — | red $\underset{\Longleftarrow}{\overset{95}{\Longrightarrow}}$ light green | 10-12 |
| Ex. 97 | " | phenol resin PP-810 (2) | stearic acid amide (25) | 2,4,6-triphenylphenoxinium chloride (0.2) | — | red $\underset{\Longleftarrow}{\overset{95}{\Longrightarrow}}$ light blue | 1.5-2 |
| Ex. 98 | " | phenol resin PP-810 (2) | stearic acid amide (25) | 6,7-diethylbenzodithiin cation perchlorate (0.2) | — | red $\underset{\Longleftarrow}{\overset{95}{\Longrightarrow}}$ light grey | 3-4 |
| Ex. 99 | " | phenol resin PP-810 (2) | stearic acid amide (25) | 2,7-dimethylthianthrene cation fluoroborate (0.2) | — | red $\underset{\Longleftarrow}{\overset{95}{\Longrightarrow}}$ light grey | 3-4 |
| Comparative Ex. 11 | Zu-P (1) | octyl p-oxybenzoate (2) | capric acid (30) | — | — | blue $\underset{\Longleftarrow}{\overset{14}{\Longrightarrow}}$ colorless | 1 |
| Ex. 100 | " | octyl p-oxybenzoate (2) | capric acid (30) | N,N,N',N'—tetrakis(p-diethylaminophenyl)-p-diphenoquinone-bis(imonium hexafluoroantimonate) (0.3) | — | blue $\underset{\Longleftarrow}{\overset{14}{\Longrightarrow}}$ light green | 5-6 |
| Ex. 101 | " | octyl p-oxybenzoate (2) | capric acid (30) | bis(p-diethylaminophenyl) ethylaminium fluoroborate (0.3) | — | blue $\underset{\Longleftarrow}{\overset{14}{\Longrightarrow}}$ light green | 3-4 |

TABLE 1-continued

| Ex. No. | Thermochromic Material | | | | | Thermochromic Properties | |
|---|---|---|---|---|---|---|---|
| | Component (a) (g) | Component (b) (g) | Component (c) (g) | Component (d) (g) | Component (e) (g) | Temperature of Coloration/Decoloration (°C.) | Light Fastness (magnification) |
| Ex. 102 | " | octyl p-oxybenzoate (2) | capric acid (30) | N—phenyl-2-methyl-7-chloro-phenothiazinium trifluoro acetate (0.3) | — | blue ⇌ light green at 14 | 3-4 |
| Ex. 103 | " | octyl p-oxybenzoate (2) | capric acid (30) | 2,4,6-tris(p-methylphenyl) phenoxinium phosphate (0.2) | — | blue ⇌ light blue at 14 | 2-2.5 |
| Ex. 104 | " | octyl p-oxybenzoate (2) | capric acid (30) | 2,7-dichlorothianthrene cation hexachloroantimonate (0.3) | — | blue ⇌ light grey at 14 | 3-4 |
| Ex. 105 | " | octyl p-oxybenzoate (2) | capric acid (30) | 2,5-dimethyl-1,4-bis(n-butylthio)benzene cation trifluoroacetate (0.3) | — | blue ⇌ light grey at 14 | 3-4 |
| Comparative Ex. 12 | CVL (1) | bisphenol A (2) | n-stearyl alcohol (50) | — | UV-326 (2) | blue ⇌ colorless at 53 | 1 |
| Ex. 106 | " | " | n-stearyl alcohol (50) | tris(p-diethylaminophenyl) aminium hexafluoroantimonate (0.3) | " | blue ⇌ light green at 52 | 20-40 |
| Ex. 107 | " | " | n-stearyl alcohol (50) | tris(p-diethylaminophenyl) aminium hexafluoroantimonate (0.3) | UV-P (1) Q-2002 (1) | blue ⇌ light green at 52 | 25-35 |
| Ex. 108 | " | " | n-stearyl alcohol (50) | tris(p-diethylaminophenyl) aminium hexafluoroantimonate (0.3) | UV-326 (2) Yellow Dye (0.2) | green ⇌ yellow at 52 | 30-50 |
| Ex. 109 | " | " | n-stearyl alcohol (50) | bis(p-di-n-butylaminophenyl) [N,N—bis(p-di-n-butylamino-phenyl)-p-aminophenyl]aminium hexafluoroantimonate (0.3) | UV-326 (2) | blue ⇌ light green at 52 | 20-40 |
| Ex. 110 | " | " | n-stearyl alcohol (50) | bis(p-di-n-butylaminophenyl) [N,N—bis(p-di-n-butylamino-phenyl)-p-aminophenyl]aminium hexafluoroantimonate (0.3) | UV-326 (2) Yellow Dye (0.2) | green ⇌ yellow at 52 | 30-50 |
| Ex. 111 | " | " | n-stearyl alcohol (50) | bis(p-di-n-butylaminophenyl) [N,N—bis(p-di-n-butylamino-phenyl)-p-aminophenyl]aminium hexafluoroantimonate (0.6) | UV-326 (2) Yellow Dye (0.2) | green ⇌ yellow at 52 | 40-50 |

TABLE 1-continued

| Ex. No. | Thermochromic Material Component (a) (g) | Component (b) (g) | Component (c) (g) | Component (d) (g) | Component (e) (g) | Thermochromic Properties Temperature of Coloration/De-coloration (°C.) | Light Fastness (magnification) |
|---|---|---|---|---|---|---|---|
| Ex. 112 | " | " | n-stearyl alcohol (50) | tetrakis(p-tolyl)hydrazinium hexachloroantimonate (0.3) | UV-326 (2) | blue ⇌ 51 light purple | 10–12 |
| Ex. 113 | " | " | n-stearyl alcohol (50) | tetrakis(p-tolyl)hydrazinium hexachloroantimonate (0.3) | UV-326 (2) Q-NBC (1) | blue ⇌ 51 light purple | 10–15 |
| Ex. 114 | " | " | n-stearyl alcohol (50) | N,N,N',N'—tetrakis(p-di-n-butylaminophenyl)-p-benzoquinone-bis(imonium hexafluoroantimonate) (0.3) | UV-326 (2) | blue ⇌ 52 light green | 20–40 |
| Ex. 115 | " | " | n-stearyl alcohol (50) | N,N,N',N'—tetrakis(p-di-n-butylaminophenyl)-p-benzoquinone-bis(imonium hexafluoroantimonate) (0.3) | UV-326 (2) Yellow Dye (2) | green ⇌ 52 yellow | 30–50 |
| Ex. 116 | PSD-V (1) | bisphenol A zinc salt (2) | cetyl alcohol (15) lauryl stearate (10) | tris(p-di-n-octylaminophenyl) aminium perchlorate (0.3) | UV-326 (2) | vermillion ⇌ 32 light green | 20–40 |
| Ex. 117 | " | bisphenol A zinc salt (2) | cetyl alcohol (15) lauryl stearate (10) | tris(p-di-n-octylaminophenyl) aminium perchlorate (0.3) | UV-326 (2) Yellow Dye (0.2) | vermillion ⇌ 32 yellow | 30–50 |
| Ex. 118 | " | bisphenol A zinc salt (2) | cetyl alcohol (15) lauryl stearate (10) | N,N,N',N'—tetrakis(p-di-n-butylaminophenyl)-p-diphenoquinone-bis(imonium fluoroborate) (0.3) | UV-326 (2) | vermillion ⇌ 32 light green | 20–40 |
| Ex. 119 | " | bisphenol A zinc salt (2) | cetyl alcohol (15) lauryl stearate (10) | N,N,N',N'—tetrakis(p-di-n-butylaminophenyl)-p-diphenoquinone-bis(imonium fluoroborate) (0.3) | UV-326 (2) Q-2002 (1) | vermillion ⇌ 32 light green | 20–30 |
| Ex. 120 | " | bisphenol A zinc salt (2) | cetyl alcohol (15) lauryl stearate (10) | N,N,N',N'—tetrakis(p-di-n-butylaminophenyl)-p-diphenoquinone-bis(imonium fluoroborate) (0.6) | UV-326 (2) Yellow Dye (0.2) | vermillion ⇌ 32 yellow | 40–50 |
| Ex. 121 | PSD-P (1) | zinc benzoate (2) | myristyl alcohol (15) stearyl caprate (10) | pentaphenylpyrrolinum perchlorate (0.2) | UV-P (2) | pink ⇌ 25 light grey | 8–10 |

TABLE 1-continued

| Ex. No. | Thermochromic Material | | | | | Thermochromic Properties | |
|---|---|---|---|---|---|---|---|
| | Component (a) (g) | Component (b) (g) | Component (c) (g) | Component (d) (g) | Component (e) (g) | Temperature of Coloration/De-coloration (°C.) | Light Fastness (magnification) |
| Ex. 122 | " | " | myristyl alcohol (15) stearyl caprate (10) | tris(p-diethylaminophenyl) aminium hexafluoroantimonate (0.1) bis(p-di-n-butylaminophenyl) [N,N—bis(p-di-n-butylamino-phenyl)-p-aminophenyl]aminium hexafluoroantimonate (0.2) | UV-326 (2) | pink ⇌ 24 light green | 20-40 |
| Ex. 123 | " | " | myristyl alcohol (15) stearyl caprate (10) | tris(p-diethylaminophenyl) aminium hexafluoroantimonate (0.1) bis(p-di-n-butylaminophenyl) [N,N—bis(p-di-n-butylamino-phenyl)-p-aminophenyl]aminium hexafluoroantimonate (0.2) | UV-326 (2) Yellow Dye (0.2) | red ⇌ 24 yellow | 30-50 |
| Ex. 124 | " | " | myristyl alcohol (15) stearyl caprate (10) | tris(p-diethylaminophenyl) aminium hexafluoroantimonate (0.1) bis(p-di-n-butylaminophenyl) [N,N—bis(p-di-n-butylamino-phenyl)-p-aminophenyl]aminium hexafluoroantimonate (0.2) | UV-326 (2) Yellow Dye (0.2) Blue Dye (0.1) | black ⇌ 24 green | 35-50 |
| Ex. 125 | " | zinc benzoate (2) | myristyl alcohol (15) stearyl caprate (10) | 1,2,4,5-tetrakis(ethylthio) benzene cation hexachloro-antimonate (0.2) | UV-P (2) Black Dye (0.05) | pink ⇌ 24 grey | 6-8 |
| Ex. 126 | IR (1) | WX (3) | stearyl stearate (25) | tris(p-di-n-butylaminophenyl) aminium fluoroborate (0.6) | UV-326 (2) | pink ⇌ 47 light green | 35-50 |
| Ex. 127 | " | " | stearyl stearate (25) | tris(p-di-n-butylaminophenyl) aminium fluoroborate (0.6) | UV-326 (2) Yellow Dye (0.2) | red ⇌ 47 yellow | 40-50 |
| Ex. 128 | " | " | stearyl stearate (25) | tetrakis(p-dimethylamino-phenyl)hydrazinium hexa-fluoroantimonate (0.3) | UV-P (2) | pink ⇌ 47 light purple | 10-15 |
| Ex. 129 | " | " | stearyl stearate (25) | tetrakis(p-dimethylamino-phenyl)hydrazinium hexa-fluoroantimonate (0.3) | UV-P (2) Blue Dye (0.1) | purple ⇌ 47 blue | 12-15 |

TABLE 1-continued

| | Thermochromic Material | | | | | Thermochromic Properties | |
|---|---|---|---|---|---|---|---|
| Ex. No. | Component (a) (g) | Component (b) (g) | Component (c) (g) | Component (d) (g) | Component (e) (g) | Temperature of Coloration/De-coloration (°C.) | Light Fastness (magnification) |
| Ex. 130 | PSD-150 (1) | bisphenol S (1) p-chloro-benzoic acid (1) | distearyl ketone (25) | bis(p-diethylaminophenyl)-ethylphospinium picrate (0.3) | UV-326 (2) | black $\underset{\rightleftarrows}{87}$ light green | 12–15 |
| Ex. 131 | " | bisphenol S (1) p-chloro-benzoic acid (1) | distearyl ketone (25) | bis(p-diethylaminophenyl)-ethylphospinium picrate (0.3) | UV-326 (2) Yellow Dye (0.2) Red Dye (0.05) | black $\underset{\rightleftarrows}{87}$ vermillion | 15–20 |
| Ex. 132 | PSD-150 (1) | bisphenol S (1) p-chloro-benzoic acid (1) | distearyl ketone (25) | 2-methylbenzo-p-dioximinum fluoroborate (0.3) | UV-P (2) Q-NBC (1) | black $\underset{\rightleftarrows}{87}$ light blue | 6–8 |
| Ex. 133 | " | bisphenol S (1) p-chloro-benzoic acid (1) | distearyl ketone (25) | 2-methylbenzo-p-dioximinum fluoroborate (0.3) | UV-103 (2) Yellow Dye (0.2) Blue Dye (0.1) | black $\underset{\rightleftarrows}{86}$ green | 10–12 |
| Ex. 134 | #1014 (1) | propyl gallate (2) | oleyl alcohol (20) phenyl benzoate (5) | bis(p-diethylaminophenyl) ethylaminium hexafluoro-antimonate (0.6) | UV-326 (2) | orange $\underset{\rightleftarrows}{-11}$ light green | 12–15 |
| Ex. 135 | " | propyl gallate (2) | oleyl alcohol (20) phenyl benzoate (5) | bis(p-diethylaminophenyl) ethylaminium hexafluoro-antimonate (0.6) | UV-326 (2) Q-NBC (0.5) superoxide dismutase nickel complex salt (0.2) | orange $\underset{\rightleftarrows}{-11}$ light green | 15–20 |
| Ex. 136 | " | propyl gallate (2) | oleyl alcohol (20) phenyl benzoate (5) | 6,7-diethyl-1,4-benzodithiin cation picrate (0.2) | UV N-35 (2) | orange $\underset{\rightleftarrows}{-13}$ light grey | 4–5 |

TABLE 1-continued

| | Thermochromic Material | | | | | | Thermochromic Properties | |
|---|---|---|---|---|---|---|---|---|
| Ex. No. | Component (a) | Component (b) | Component (c) | Component (d) | Component (e) | | Temperature of Coloration/De-coloration (°C.) | Light Fastness (magnification) |
| Ex. 137 | 3-(4-n-butyl-amino-phenyl)-3-(1,2-dimethyl-indol-3-yl)phth-alide (1) | copper 2-hydroxy-3-naphthonate (2) | stearic acid (20) docosyl alcohol (20) | bis(p-diisopropylaminophenyl) [N,N—bis(p-diisopropylamino-phenyl)-p-aminophenyl]aminium hexafluoroantimonate (0.3) | UV-326 (2) | | purple ⇌ 69 ⇌ light green | 20-40 |
| Ex. 138 | 3-(4-n-butyl-amino-phenyl)-3-(1,2-dimethyl-indol-3-yl)phth-alide (1) | copper 2-hydroxy-3-naphthonate (2) | stearic acid (20) docosyl alcohol (20) | bis(p-diisopropylaminophenyl) [N,N—bis(p-diisopropylamino-phenyl)-p-aminophenyl]aminium hexafluoroantimonate (0.6) | " | | purple ⇌ 69 ⇌ light green | 35-50 |
| Ex. 139 | 3-(4-n-butyl-amino-phenyl)-3-(1,2-dimethyl-indol-3-yl)phth-alide (1) | copper 2-hydroxy-3-naphthonate (2) | stearic acid (20) docosyl alcohol (20) | bis(p-diisopropylaminophenyl) [N,N—bis(p-diisopropylamino-phenyl)-p-aminophenyl]aminium hexafluoroantimonate (0.6) | UV-326 (2) Yellow Dye (0.3) | | black ⇌ 69 ⇌ yellow | 40-50 |
| Ex. 140 | 3-(4-n-butyl-amino-phenyl)-3-(1,2-dimethyl-indol-3-yl)phth-alide (1) | copper 2-hydroxy-3-naphthonate (2) | stearic acid (20) docosyl alcohol (20) | N,N—bis(p-diethylaminophenyl)-N′,N′—diethyl-p-benzoquinone-bis(imonium trifluoroacetate) (0.3) | UV-P (2) | | purple ⇌ 69 ⇌ light green | 15-20 |

TABLE 1-continued

| Ex. No. | Thermochromic Material Component (a) (g) | Component (b) (g) | Component (c) (g) | Component (d) (g) | Component (e) (g) | Thermochromic Properties Temperature of Coloration/Decoloration (°C) | Light Fastness (magnification) |
|---|---|---|---|---|---|---|---|
| Ex. 141 | 3-(4-n-butyl-aminophenyl)-3-(1,2-dimethyl-indol-3-yl)phthalide (1) | copper 2-hydroxy-3-naphthonate (2) | stearic acid (20) docosyl alcohol (20) | N,N—bis(p-diethylaminophenyl)-N,N′—diethyl-p-benzoquinone-bis(imonium trifluoroacetate) (0.3) | UV-P (2) Q-2002 (1) | purple ⇌ 69 light green | 18–22 |
| Ex. 142 | 3-(4-n-butyl-aminophenyl)-3-(1,2-dimethyl-indol-3-yl)phthalide (1) | copper 2-hydroxy-3-naphthonate (2) | stearic acid (20) docosyl alcohol (20) | N—phenyl-2-methyl-7-chloro-phenothiazinium fluoroborate (0.3) | UV-326 (2) Black Dye (0.05) | purple ⇌ 69 grey | 10–15 |
| Ex. 143 | #1017 (1) | octyl p-oxybenzoate (2) | diphenylether (25) | bis(p-di-n-butylaminophenyl) [N,N—bis-(p-di-n-butylamino-phenyl)-p-aminophenyl]aminium hexafluoroantimonate (0.3) | UV-P (2) | green ⇌ 4 light green | 20–25 |
| Ex. 144 | ″ | octyl p-oxybenzoate (2) | ″ | bis(p-di-n-butylaminophenyl) [N,N—bis-(p-di-n-butylamino-phenyl)-p-aminophenyl]aminium hexafluoroantimonate (0.3) | UV-P (2) Yellow Dye (0.2) | green ⇌ 4 yellow | 25–35 |
| Ex. 145 | ″ | octyl p-oxybenzoate (2) | ″ | phenoxanthiin cation trifluoroacetate (0.3) | UV-326 (2) | green ⇌ 4 light grey | 6–8 |
| Ex. 146 | ″ | octyl p-oxybenzoate (2) | ″ | phenoxanthiin cation trifluoroacetate (0.3) | UV-326 (2) Q-2002 (1) | green ⇌ 4 light grey | 8–10 |
| Ex. 147 | Y-1 (1.5) | octylphenol (3) | 12-hydroxy-stearic acid triglyceride (30) | tris(p-di-n-butylamino-phenyl)aminium hexafluoro-arsenate (0.3) | UV-326 (1) UV-103 (1) | yellow ⇌ 63 light green | 20–30 |
| Ex. 148 | ″ | ″ | 12-hydroxy-stearic acid triglyceride (30) | tris(p-di-n-butylamino-phenyl)aminium hexafluoro-arsenate (0.3) | UV-326 (2) Blue Dye (0.02) | green ⇌ 64 blue | 20–30 |

TABLE 1-continued

| | Thermochromic Material | | | | | Thermochromic Properties | |
|---|---|---|---|---|---|---|---|
| Ex. No. | Component (a) (g) | Component (b) (g) | Component (c) (g) | Component (d) (g) | Component (e) (g) | Temperature of Coloration/De-coloration (°C.) | Light Fastness (magnification) |
| Ex. 149 | " | " | 12-hydroxy-stearic acid triglyceride (30) | N-phenyl-2,7-dimethylpheno-thiazinium hexafluoroanti-monate (0.3) | UV N-35 (2) | yellow ⇌ 63 light green | 10-12 |
| Ex. 150 | " | " | 12-hydroxy-stearic acid triglyceride (30) | N-phenyl-2,7-dimethylpheno-thiazinium hexafluoroanti-monate (0.3) | Q-NBC (1) | yellow ⇌ 65 light green | 8-10 |
| Ex. 151 | PSD-R (1) | phenol resin PP-810 (2) | stearic acid amide (25) | tetrakis(p-ethylphenyl) hydrazinium hexafluoro-antimonate (0.3) | UV-P (2) | red ⇌ 94 light purple | 10-15 |
| Ex. 152 | " | phenol resin PP-810 (2) | stearic acid amide (25) | tetrakis(p-ethylphenyl) hydrazinium hexafluoro-antimonate (0.3) | UV-P (2) Yellow Dye (0.2) | red ⇌ 94 yellow | 15-20 |
| Ex. 153 | " | phenol resin PP-810 (2) | stearic acid amide (25) | 2,7-dimethylthianthrene cation fluoroborate (0.2) | UV-326 (2) | red ⇌ 94 light grey | 6-8 |
| Ex. 154 | " | phenol resin PP-810 (2) | stearic acid amide (25) | 2,7-dimethylthianthrene cation fluoroborate (0.2) | UV-326 (2) Black Dye (0.05) | red ⇌ 94 grey | 8-12 |
| Ex. 155 | Zn-P (1) | octyl p-oxy-benzoate (2) | capric acid (30) | N,N,N',N'-tetrakis(p-di-ethylaminophenyl)-p-diphenoquinone-bis-(imonium hexafluoroantimonate) (0.3) | UV-326 (2) | blue ⇌ 13 light green | 10-12 |
| Ex. 156 | " | octyl p-oxy-benzoate (2) | " | N,N,N',N'-tetrakis(p-di-ethylaminophenyl)-p-diphenoquinone-bis-(imonium hexafluoroantimonate) (0.3) | UV-326 (2) Yellow Dye (0.2) | green ⇌ 13 yellow | 12-15 |
| Ex. 157 | " | octyl p-oxy-benzoate (2) | " | 2,4,6-tris(p-methylphenyl) phenoxinium perchlorate (0.3) | UV-103 (2) Q-2002 (1) | blue ⇌ 12 light blue | 5-6 |
| Ex. 158 | " | octyl p-oxy-benzoate (2) | " | 2,4,6-tris(p-methylphenyl) phenoxinium perchlorate (0.3) | UV N-35 (2) Black Dye (0.05) | blue ⇌ 12 grey | 6-7 |

Comparing typical thermochromic materials with typical comparative thermochromic materials, all being described in Table 1, improvements in the light-fastness were determined by means of spectrum of reflectance.

A thermochromic material was uniformly coated on Kent paper (208 g/m$^2$) and the coated surface was exposed to sun light for a predetermined period (started on Sept. 5, 1980). At the end of the period, the spectrum of the coated surface was determined by the use of a spectrophotometer. The results are shown in the accompanying drawings.

Figure 2:
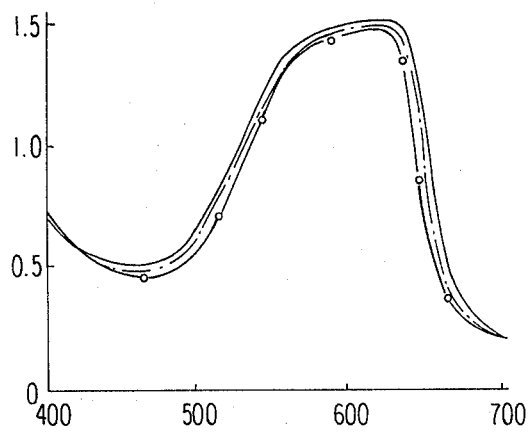

FIGS. 1 and 2 are spectra of the samples of Examples 2 and 106, respectively.

Figure 3:
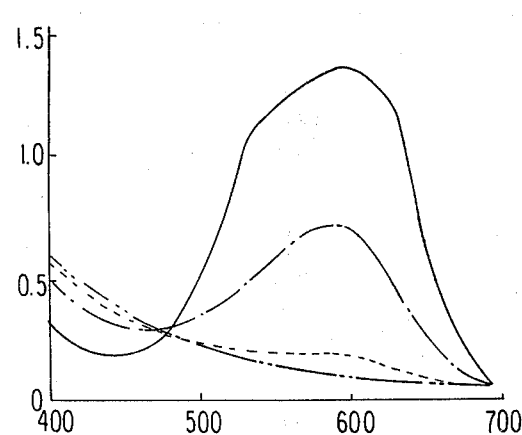
FIGS. 3 and 4 show spectra of the comparative samples of Comparative Examples 1 and 12, respectively.
Figure 4:
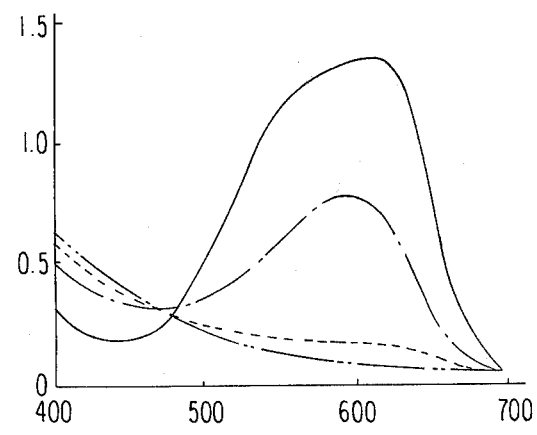

FIGS. 3 and 4 are spectra of the comparative samples of Comparative Examples 1 and 12, respectively.

In all figures the ordinate indicates absorbance and the abcissa indicates wavelength (nm).

| Type of Line | Spectrum |
| --- | --- |
| — | before exposure |
| — . — . — . — | after 5 days |
| · · · · · · · | after 10 days |
| — . . — . . — . . | after 20 days |
| — o — o — o — | after 30 days |

As is apparent from the figures, the comparative thermochromic material samples of Comparative Examples and 12 (FIGS. 3 and 4) showed marked fading on exposure for 5 days, and after 10 days the color almost disappeared. On the other hand, the thermochromic material sample of Example 2 (FIG. 1) showed almost no fading even after 20 days, indicating that the light-fastness thereof was greatly improved. Also, the thermochromic material sample of Example 106 (FIG. 2) showed almost no fading even after exposure for 30 days, indicating that the light-fastness thereof was excellent.

Examples 159 to 167 illustrate microencapsulated thermochromic materials.

EXAMPLE 159

0.5 g of hexamethylene bischloroformate was dissolved in 30 g of the thermochromic material prepared in Example 2 by heating at 80° C. The resulting solution was added dropwise to 200 g of a 5% aqueous solution of gelatin and stirred yield fine droplets. Subsequently, a solution of 3 g of hexamethylenediamine in 50 g of water was gradually added to the above solution which was still being stirred. On stirring the resulting solution for 4 hours while maintaining the temperature at about 50° C., the hexamethylene chloroformate reacted with the hexamethylenediamine at the interface between the fine droplet of the thermochromic material and water, forming a solid polyurethane which was insoluble in the water and the thermochromic material. The thus formed solid polyurethane covered the thermochromic material yielding microcapsules of the thermochromic material. The microencapsulated thermochromic material had excellent light-fastness as in the case of Example 2.

EXAMPLE 160

5 g of an epoxy resin (Bisphenol A diglycidyl polyether (average molecular weight: 378)) was dissolved in 30 g of the thermochromic material prepared in Example 23 by heating at 80° C. The solution was added dropwise to 150 g of a 5% aqueous solution of gelatin and stirred to yield fine droplets at 70° C. Subsequently, a solution of 3 g of a hardener (amine adduct of epoxy resin) in 20 g of water was gradually added to the above solution which was still being stirred at 70° C. On stirring the resulting solution for about 4 hours while maintaining the solution temperature at 80° C., the epoxy resin reacted with the hardener at the interface between the droplet of the thermochromic material and water, forming a solid polymeric material which was insoluble in the water and the thermochromic material. The thus formed solid polymeric material covered the thermochromic material, yielding microcapsules (size: 5 to 10μ) of the thermochromic material. The microencapsulated thermochromic material had excellent light-fastness as in the case of Example 23.

EXAMPLE 161

1.0 g of aliphatic polyisocyanate (NCO content: 15%; solic content: 75%) was dissolved in 30 g of the thermochromic material prepared in Example 35 by heating at 80° C. The solution was added dropwise to 150 g of a 3% aqueous solution of polyvinyl alcohol (degree of polymerization: 1000–1500; degree of saponification: 86–89 mole %) and stirred at 70° C. so as to yield fine droplets. Subsequently, a solution of 2 g of a hardener (amine adduct of epoxy resin) in 20 g of water was gradually added to the above solution which was still being stirred. On stirring the resulting solution for about 5 hours while maintaining the solution temperature at 50° C., the polyisocyanate reacted with the hardener at the interface between the fine droplet of the thermochromic material and water, forming a solid polyurea which was insoluble in the thermochromic material and the water. The thus formed solid polyurea covered the thermochromic material, yielding microcapsules (size: 5 to 10μ) of the thermochromic material. The microencapsulated thermochromic material had excellent light-fastness as in the case of Example 35.

EXAMPLE 162

4 g of bisphenol A was dissolved in 200 g of a 0.8% aqueous solution of sodium hydroxide. To the solution was added 30 g of the thermochromic material prepared in Example 45 in which 3 g of terephthalic acid dichloride had been dissolved by heating at 80° C., and the resulting mixture was stirred at 60° C. until fine droplets were formed. Subsequently, on stirring the solution for about 1 hour while maintaining the solution temperature at 50° C., the terephthalic acid dichloride reacted with the bisphenol A at the interface between the fine droplet of the thermochromic material and water, forming a solid saturated polyester which was insoluble in the thermochromic material and the water. The thus formed solid saturated polyester covered the thermochromic material, yielding microcapsules (size: 5 to 10μ) of the thermochromic material. The microencapsulated thermochromic material had excellent light-fastness as in the case of Example 45.

EXAMPLE 163

To a solution of 15 g of a urea-formaldehyde precondensate (solid content: 38%; specific gravity: 1.16) in 135 g of water was added dropwise 30 g of the thermochromic material prepared in Example 115. The mixture was stirred at 60° C. until fine droplets were formed. The pH of the mixture was then lowered to 4 by the addition of citric acid. On stirring the mixture for 5 hours while maintaining the temperature at 45° to 50°

C., a polymeric material was formed which was insoluble in the thermochromic material and the water. The thus formed polymeric material covered the thermochromic material, yielding microcapsules (size: 5 to 10μ) of the thermochromic material. The microencapsulated thermochromic material had excellent light-fastness as in the case of Example 115.

EXAMPLE 164

To 80 g of a 5% aqueous solution of gelatin was added dropwise 30 g of the thermochromic material prepared in Example 142 which had been heated to 80° C., and the mixture was stirred at 70° C. until fine droplets were formed. Then, 80 g of 5% gum arabic was added. The pH of the resulting mixture was lowered to 5 by the addition of acetic acid while performing a predetermined degree of stirring, and coacerration was caused by adding 200 g of water. Then, the pH of the mixture was lowered to 4.4, and 1 g of 37% formalin was added to cause hardening. The above procedure was performed at a temperature of 50° C. Subsequently, the concentrated liquid-like wall was cooled to 10° C. in order to cause gelation. When the pH was increased to 9 and the film was allowed to stand for several hours, microcapsules (size: 5 to 10μ) of the thermochromic material were obtained. The microencapsulated thermochromic material had excellent light-fastness as in the case of Example 142.

EXAMPLE 165

The thermochromic material prepared in Example 59 was microencapsulated in the same manner as in Example 159. Microcapsules having a size of 5 to 10μ were obtained.

EXAMPLE 166

The thermochromic material prepared in Example 123 was microencapsulated in the same manner as in Example 160. Microcapsules having a size of 5 to 10μ were obtained.

EXAMPLE 167

The thermochromic material prepared in Example 118 was microencapsulated in the same manner as in Example 164. Microcapsules having a size of 5 to 10μ were obtained.

The thermochromic material of this invention is advantageous over conventional thermochromic materials, i.e., the light-fastness of the thermochromic material of the present invention is markedly increased 10 to 50 times that of conventional thermochromic materials. Thus, the thermochromic material of this invention can be used in new applications in which high stability is required, as well as in known applications in which the conventional thermochromic materials are used.

Hereinafter, various application fields and uses of the thermochromic material of the invention will be described.

The thermochromic material of this invention finds use based on its interesiting functions which can be divided broadly into: (1) a temperature-indicating function and (2) a color producing function, e.g., as an amusement device due to coloration/decoloration, magical properties, etc., as a fashion means, and for background shading (camouflage).

(1) Detection of Temperature by Color
   1. Detection of temperature, in particular, in low temperature environments.
   2. Measurement of temperature distribution in heat exchangers, reactors, autoclaves, heating devices, etc.
   3. Inspection of chemical reactions, etc., by color changes caused by an increase or decrease in temperature.
   4. Detection of the reaction heat of two or more mixed chemicals.
   5. Prevention of accidents by indicating the temperature in a container of dangerous materials or in a storeroom.
   6. Indication of suitable temperatures for the storage of chemical products.
   7. Control of the temperature of precision devices within a suitable range.
   8. Temperature indicator for the early detection of heat generated by over loaded electric circuits and appliances.
   9. Early detection of vehicle overheating.
   10. Early detection and prevention of freezing in cold seasons.

(2) Detection of Temperature in Home Appliances
   1. Indication of safe and suitable temperatures for home electrical and gas appliances.
Indication of suitable temperatures for a refrigirator, a cooler, a heating device, etc., and indication of suitable temperatures and safe operation of an electric pot, iron, toaster, drier, hair curler, electric blanket, electrically heated carpet, hot water heater, etc.
   2. Indication of the temperatures of a bath and the like. Applied to a lid or inner lid of a bath, a stirring rod, a washbowl, a seal, etc. to indicate the temperature of the bath by means of color changes.
Determination of the temperature of a gas kettle, a chimney, etc.
   3. Induction of the temperature of houshold goods, general goods, food and drink containers, etc.
   4. Thermometer
Indoor thermometer utilizing color-changes (3) Temperature Control and Indication of Suitable Temperature for the Storage of Foods and Drinks
   1. Indication of the temperature of frozen and chilled foods, ice, etc.
   2. Indication of the temperature of a drinkable product such as beer, sake, milk, juice, etc.
   3. Indication of the temperature of retort foods.
   4. Indication of the temperature of instant foods.
   5. Temperature control of confectionery and raw confectionary products
   6. Temperature control of fruits and vegetables.

(4) Temperature Control and Indication of Temperature in Medical Applications
   1. Detection of inflamed areas.
   2. Quality control, and storage at suitable temperatures of pharmaceuticals and indication of the used temperature.
   3. Temperature control during medical treatment by means of color changes.

(5) Quality control and indication of suitable temperature for storage of cosmetics.

(6) Determination of insulating ability of heat insulators.

(7) Determination of heat-holding ability of heat holders.

(8) Temperature control and indication of suitable temperature for products whose quality and performance are greatly influenced by environmental temperature.

Hereinafter, various amusement effects caused by various coloration/decoloration phenomena are described.

(1) Toys, Teaching Materials, and Writing Materials

1. Coloration/decoloration by the temperature of a bath.

Goldfish, handkerchief, towel, doll, stuffed toy, picture bood in bath, shampoo container, etc.

2. Explanation utilizing color changes caused by heat conduction and friction

Celluloid board, eraser, pencil, etc.

3. Hiding Ability (temperature dependent opacifying (such as by image formation) ability).

Practice of names of stars, flowers, animals, letters, etc. spy prints, etc.

4. Play sets

Clays for cooking utensils, cups, straws, etc.

5. Applications in fashion products, such as miscellaneous small articles such as bags.

(2) Publications, Magazines and Miscellaneous Printings

1. Utilization in supplements, covers, frontpieces, etc., of magazines.
2. Greeting cards, name cards, etc.
3. Books, picture books, etc., in which the color changes according to the temperature change.

(3) Food and Cooking

Utilization in glass cups, porcelain cups, paper cups, saucepans, coasters, icepails, steins, shakers, spoons, feeding bottles, etc.

(4) Dresses and Other Ornaments

Gloves, ski wear, boots, hats, T-shirt, stickers, neckties, necktie pins, broockes, swimming suits, jackets, etc.

(5) Decoration

Ribbon flowers, pictures, display panels such as photographs, stuffed toys, calenders, illumination equipment, etc.

(6) Advertizement

Display panels, matches, gift cards, etc.

(7) Sales Promotion and Premiums

Wrapping materials for candies, paper cups, and utilization the eye-catching properties of the thermochromic materials in wrapping materials for foods, drinks, cosmetics, toys, writing materials, etc.

In addition, the thermochromic material of the invention can be used to prevent counterfeit, etc., by the utilization of the special capability thereof which cannot be obtained using other materials.

While the invention has been described in detail and with reference to specific embodiments thereof, it will be apparent to one skilled in the art that various changes and modifications can be made therein without departing from the spirit and scope thereof.

What is claimed is:

1. In a reversible thermochromic material comprising (a) one or more electron-donating, chromatic organic compounds selected from the group consisting of diaryl phthalides, aryl phthalides, indolylphthalides, polyarylcarbinols, leucoauramines, acrylauramines, arylauramines, rhodamine B lactams, indolines, spiropyrans, fluorans, thiofluorans, phenothiazines, triphenylmethanes, diarylarylfurans, spiroxanthenearylfurans, and chromenoindoles, (b) one or more compounds, compounds, which are capable of reversibly accepting electrons of said organic compound, selected from the group consisting of phenolic hydroxy group-containing compounds and derivatives thereof and carboxyl group-containing compounds and derivatives thereof, and (c) one or more compounds, which are controlling the temperature and sensitivity of coloration/decoloration of said thermochromic material, selected from the group consisting of alcohols, esters, ketones, esters, acid amides and carboxylic acids, the ratio of each component to others (a):(b):(c) being 1:0.1 to 10:1 to 100 by weight, the improvement which comprises said thermochromic material further containing (d) one or more radical cationic compound selected from the group consisting of N-radical cationic, P-radical cationic, O-radical cationic and S-radical cationic compounds having aromatic ring(s), in an amount of from 0.01 to 5 parts by weight per 1 part by weight of said electron-donating chromatic organic compound, said radical cationic compound interacting with said electron-donating, chromatic organic compound to stabilize said compound, resulting in a thermochromic mateiral with an improved resistance to light.

2. A thermochromic material as set forth in claim 1, wherein said radical cationic compound is selected from the group consisting of aminium salts and diimonium salts represented by the following general formulas (N-I) and (N-II), respectively:

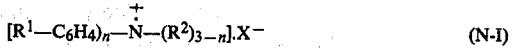

$$[R^1-C_6H_4)_n-\overset{+}{N}-(R^2)_{3-n}].X^-  \qquad (N\text{-}I)$$

wherein $n = 1, 2$ or $3$;

$R^1 =$ a hydrogen atom, an alkyl group (containing 1 to 18 carbon atoms), or a dialkylamino group (each alkyl group thereof containing 1 to 18 carbon atoms);

$R^2 =$ a hydrogen atom, an alkyl group (containing 1 to 18 carbon atoms), or a di(substituted phenyl) amino group (the substituent including a hydrogen atom and an alkyl group containing 1 to 18 carbon atoms), provided that when $n = 1$, two $R^2$ groups may be combined to form any one of the following groups:

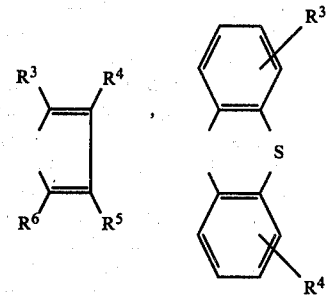

(wherein $R^3$, $R^4$, $R^5$ and $R^6 =$ hydrogen atoms, or an alkyl group (containing 1 to 18 carbon atoms)); and $X^- =$ perchlorate ($ClO_4^-$), fluoroborate ($BF_4^-$), trichloroacetate ($CCl_3COO^-$), trifluoroacetate ($CF_3COO^-$), picrate ($(NO_2)_3C_6H_2O^-$), hexafluoroarsenate ($AsF_6^-$), hexachloroantimonate ($SbCl_6^-$), hexafluoroantimonate ($SbF_6^-$), benzenesulfonate ($C_6H_5SO_3^-$), alkylsulfonate ($RSO_3^-$, the alkyl group thereof containing 1 to 18 carbon atoms), phosphate ($PO_4^{3-}$), sulfate ($SO_4^{2-}$), chloride ($Cl^-$) or bromide ($Br^-$),

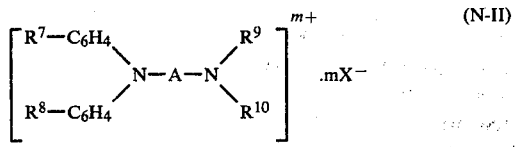

wherein

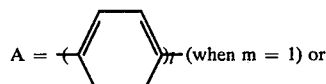

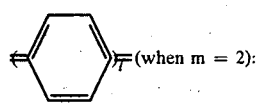

l = 1 or 2;
m = 1 or 2;
$R^7$ = a hydrogen atom, an alkyl group (containing 1 to 18 carbon atoms), a dialkylamino group (each alkyl group thereof containing 1 to 18 carbon atoms) or a diethanolamino group;
$R^8$ = a hydrogen atom, an alkyl group (containing 1 to 18 carbon atoms), a dialkylamino group (each alkyl group thereof containing 1 to 18 carbonatoms) or a diethanolamino group;
$R^9$ = a phenyl group, an alkyl group (containing 1 to 18 carbon atoms), a 4-dialkylaminophenyl group (each alkyl group thereof containing 1 to 18 carbon atoms) or a 4-diethanolaminophenyl group;
$R^{10}$ — a phenyl group, an alkyl group (containing 1 to 18 carbon atoms), a 4-dialkylaminophenyl group (each alkyl group thereof containing 1 to 18 carbon atoms) or a 4-diethanolaminophenyl group; and
$X^-$ — the same as for the general formual (N-I).

3. A thermochromic material as set forth in claim 1, wherein said thermochromic material contains one or more of
ultraviolet absorbers selected from the group consisting of 2,4-dihydroxybenzophenone, 2-hydroxy-4-methoxybenzophenone, 2-hydroxy-4-octoxybenzophenone, 2-hydroxy-4-dodecyloxybenzophenone, 2-hydroxy-4-octadecyloxybenzophenone, phenyl salicylate, p-tertbutylphenyl salycilate, p-octylphenyl salycilate, 2-(2'-hydroxy-5'-methylphenyl)benzotriazole, 2-(2'-hydroxy-3',5'-di-tert-butylphenyl)benzotriazole, 2-(2'hydroxy-8'tert-butyl-1',5'-methylphenyl)5-chlorobenzotriazole, 2-(2'-hydroxy-3',5'-di-tertbutylphenyl)-5-chlorobenzotriazole, 2-(2'-hydroxy-3',5'-tertbutylphenyl)-5-chlorobenzotriazole, 2-(2'-hydroxy-4'-octoxyphenyl)benzotriazole, 2'-ethylhexyl-2-cyano-8-phenyl cinnamate and resorcinol monobenzoate;
visible light absorbers selected from the group consisting of monoazo-, bisazo-, metal complex salt type monoazo-, anthraquinone-, phthalocyanine- and triphenylmethane-based dyes, and monoazo-, bisazo-, metal complex salt type monoazo-, anthraquinone-, indigo-, thioindigo-, phthalocyanine-, triphenylmethane- and xanthene-based pigments;
antioxidants selected from the group consiting of 2,6-di-tert-butyl-4-methylphenol, 2,4,6-tri-tert-butylphenol, 2,2'-methylenebis(4-methyl-6-tert-butylphenol), 4,4'-isopropylidene-bisphenol, 2,6-bis(2'-hydroxy-3'-tert-butyl-5'-methylbenzyl)-4-methyl-phenol, 4,4'-thiobis-(3-methyl-6-tertbutyl-phenol), tetrakis[methylene(3,5-di-tert-butyl-4-hydroxyhydrocinnamate)] methane, p-hydroxyphenyl-3-naphthylamine, 2,2,4-trimethyl-1,2-dihydroxyquinoline, thiobis($\beta$-naphthol), mercaptobenzothiazole, mercaptobenzimidazole, aldol-$\alpha$-naphthylamine, bis-(2,2,6,6-tetramethyl-4-piperidyl)sebacate, 2,2,6,6-tertramethyl-4-piperidylbenzoate, dilauryl-8,8'-thiodipropionate, distearyl-8,8'-thiodipropionate and tris(4-nonylphenol)phosphite;
singlet oxygen quenchers selected from the group consisting of 1,4-diazabicyclo [2,2,2]octane (DABCO), $\beta$-carotene, 1,3-cyclohexadiene, 2-diethylaminomethylfuran, 2-phenylaminomethylfuran, 9-diethylaminomethylanthrathene, 5-diethylaminomethyl-6-phenyl-3,4-dihydroxypyran, nickel dimethyl dithiocarbamate, nickel dibutyl dithiocarbamate, nickel 3,5-di-tert-butyl-4-hydroxybenzyl o-ethylphosphate, nickel 3,5-di-tert-butyl-4-hydroxybenzyl o-butylphosphate, nickel-[2,2'-thiobis(4-tertoctylphenolate)](n-butylamine), nickel [2,2'-thiobis(4-tertoctylphenolate](2-ethylhexylamine), nickel bis[2,2'-thio-bis(4-tertoctylphenolate)], nickel bis[2,2'-sulfone-bis(4-octylphenolate)], nickel bis-(2-hydroxy-5-methoxyphenyl-N-n-butylaldoimine), nickel bis-(dithiobenzyl), and nickel bis(dithiobiacetyl); and
superoxide anion quenchers selected from the group consisting of super oxide dimustase and complexes of cobalt (III) and nickel (II),
in an amount of from 0.5 to 10% by weight of the whole.

4. A thermochromic material as set forth in claim 1, wherein said thermochromic material is in microcapsules having a size not exceeding 30 μm.

5. A thermochromic material as set forth in claim 2, wherein said thermochromic material is in microcapsules having a size not exceeding 30 μm.

6. A thermochromic material as set forth in claim 3 wherein said thermochromic material is in microcapsules having a size not exceeding 30 μm.

* * * * *